(12) United States Patent
Arora et al.

(10) Patent No.: US 8,935,602 B2
(45) Date of Patent: Jan. 13, 2015

(54) HIERARCHICAL DRAG AND DROP STRUCTURE EDITOR FOR WEB SITES

(75) Inventors: Samir Arora, San Jose, CA (US); Gagan Arora, Santa Clara, CA (US); Rajagopal Lakshminarayan, Lafayette, LA (US); Gregory Brown, Summerville, SC (US); Martin Frid-Nielsen, Santa Cruz, CA (US); Clement Mok, San Francisco, CA (US); David Kleinberg, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1877 days.

(21) Appl. No.: 11/655,432

(22) Filed: Jan. 19, 2007

(65) Prior Publication Data

US 2007/0118793 A1 May 24, 2007

Related U.S. Application Data

(63) Continuation of application No. 10/263,124, filed on Oct. 2, 2002, now Pat. No. 7,246,307, which is a continuation of application No. 09/158,644, filed on Sep. 22, 1998, now abandoned, which is a continuation of application No. 08/687,971, filed on Jul. 29, 1996, now Pat. No. 5,911,145.

(51) Int. Cl.
*G06F 17/00* (2006.01)
*G06F 17/30* (2006.01)
*G06F 17/21* (2006.01)
*G06F 17/22* (2006.01)
*G06F 17/24* (2006.01)

(52) U.S. Cl.
CPC .......... *G06F 17/30882* (2013.01); *G06F 17/21* (2013.01); *G06F 17/2247* (2013.01); *G06F 17/24* (2013.01)

USPC .......................... 715/208; 715/205; 715/234

(58) Field of Classification Search
USPC ......... 715/202, 205–208, 255, 730, 764, 853, 715/854, 762, 763; 707/100, 101; 717/105, 717/113
See application file for complete search history.

(56) References Cited

U.S. PATENT DOCUMENTS 5,446,837 A 8/1995 Motoyama et al.
5,546,517 A * 8/1996 Marks et al. .................. 715/206

(Continued)

FOREIGN PATENT DOCUMENTS

WO WO-94/02949 12/1994

OTHER PUBLICATIONS

Don Dugdale, "Selections for Web Publishing", Feb. 1996, pp. 46-50, http://www.uniforum.org/publications/ufm/feb96/selections.pdf.*

(Continued)

*Primary Examiner* — Adam M. Queler
(74) *Attorney, Agent, or Firm* — Kilpatrick Townsend & Stockton LLP

(57) ABSTRACT

A method and apparatus for a structure editor implementing a "top-down" approach to designing a Web page. The user uses a "drag and drop" interface to add, delete, and move display elements to define the hierarchy of the site and to define the layout of each page in the site. The present invention automatically generates a layout for each page. This layout contains display elements that represent the links between pages of the site. The present invention automatically adds, removes, and deletes the appropriate links between the pages of the site as the user moves display elements. After the user has defined the hierarchy of the site and the layout of each page in the site, the user "publishes" the site. The publish function automatically generates HTML for each page of the site in accordance with the display elements of each page, yielding true WYSIWYG pages for the site.

14 Claims, 44 Drawing Sheets

(56) References Cited

U.S. PATENT DOCUMENTS

| | | | | |
|---|---|---|---|---|
| 5,546,519 | A | * | 8/1996 | Berry .......................... 715/763 |
| 5,632,022 | A | | 5/1997 | Warren et al. |
| 5,634,062 | A | * | 5/1997 | Shimizu et al. ............... 715/206 |
| 5,634,095 | A | * | 5/1997 | Wang et al. ................... 715/763 |
| 5,644,736 | A | | 7/1997 | Healy et al. |
| 5,644,740 | A | | 7/1997 | Kiuchi et al. |
| 5,680,619 | A | * | 10/1997 | Gudmundson et al. ....... 717/108 |
| 5,694,594 | A | * | 12/1997 | Chang .................................. 1/1 |
| 5,701,137 | A | * | 12/1997 | Kiernan et al. ................ 715/853 |
| 5,724,595 | A | * | 3/1998 | Gentner ........................ 715/206 |
| 5,727,156 | A | * | 3/1998 | Herr-Hoyman et al. ...... 709/219 |
| 5,745,360 | A | | 4/1998 | Leone et al. |
| 5,748,186 | A | | 5/1998 | Raman |
| 5,758,361 | A | * | 5/1998 | van Hoff ....................... 715/236 |
| 5,801,702 | A | * | 9/1998 | Dolan et al. ................... 715/854 |
| 5,802,299 | A | * | 9/1998 | Logan et al. .................. 709/218 |
| 5,845,299 | A | | 12/1998 | Arora et al. |
| 5,870,552 | A | * | 2/1999 | Dozier et al. ................. 709/219 |
| 5,890,170 | A | * | 3/1999 | Sidana .......................... 715/207 |
| 5,911,145 | A | | 6/1999 | Arora et al. |
| 5,953,731 | A | * | 9/1999 | Glaser ........................... 715/234 |
| 5,956,736 | A | * | 9/1999 | Hanson et al. ................ 715/234 |
| 6,029,182 | A | * | 2/2000 | Nehab et al. .................. 715/205 |
| 6,034,689 | A | * | 3/2000 | White et al. ................... 715/854 |
| 6,035,330 | A | | 3/2000 | Astiz et al. |
| 6,144,962 | A | * | 11/2000 | Weinberg et al. ............... 707/10 |
| 6,148,311 | A | * | 11/2000 | Wishnie et al. ............... 715/205 |
| 6,199,098 | B1 | * | 3/2001 | Jones et al. ................... 709/203 |
| 6,341,310 | B1 | | 1/2002 | Leshem et al. |
| 6,505,212 | B2 | * | 1/2003 | Nakano et al. ................ 707/200 |
| 7,246,307 | B2 | | 7/2007 | Arora et al. |
| 7,278,098 | B1 | | 10/2007 | Boye et al. |
| 7,287,215 | B2 | * | 10/2007 | Arcuri et al. .................. 715/206 |

OTHER PUBLICATIONS

Adobe SiteMill User Guide, Version 1.0, pp. 1-129, (1995).

Rupley, "FrontPage gets a Microsoft Face-Life," PC Magazine Online, taken from http://www.Zdnet.com.au/pcmag/news/trends/t960408b.htm, (Apr. 8, 1996).

Mullen, "Vermeer Lets Web Authors Skip the Programming," Web Week, vol. 1, No. 4, (Aug. 1995), taken from http://www.internetworld.com/print/1995/08/01/news/vermeer.html.

Rosenthal, M., "Adobe SiteMill 1.0," reprinted from Web Developer Magazine, vol. 2, No. 2 , May/Jun. 1996, http://www.webdeveloper.com/categories/management_reviews_site6/2/98.m, 6 pages.

"Weaving Your Web," http://www.zdnet.com/mascuser/mu_0896/sitemanage.html, 2 pages )plus 2 pages of graphics cited in the article, copyright 1996.

"SiteMill 2.0 Features," available from Adobe System, Inc., 2 pages, publication date unknown.

Rathbone, Andy, "Windows 95 for Dummies," book published by IDG Books World Wide, Inc. pp. 234-235, (1995).

U.S. Appl. No. 11/866,346, filed Oct. 2, 2007.

* cited by examiner

Internal Representation

Internal Representation

700

| Number |
| --- |
| Type |
| Name |
| Collection Number |
| Parent Number |
| Next Sibling Number |
| First Child Number |
| Current Layout |
| Stacked Flag |
| Expanded Flag |
| Publish Page |
| Page Color |
| Status |
| Comments |

A Page Object/
Node
Fig. 7

Initialize

Create Node/Page

Move Node/Page

Page Profile

Properties Window
(Site Tab)

Properties Window
(View Tab)

Collapse a branch

Expand a branch

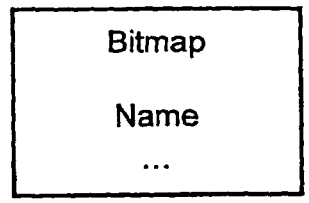
Banner
Fig. 25
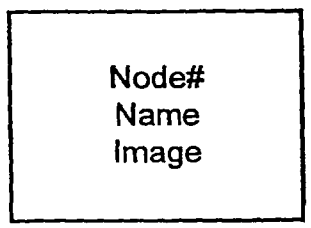 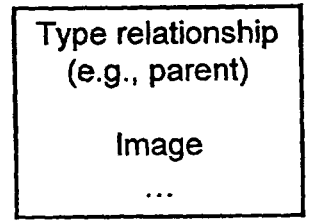
Navigator Buttons
Fig. 26(a)
Navigator Buttons
Fig. 26(b)
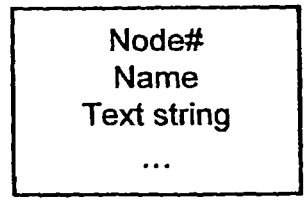
Text Button
Fig. 27

2902

Publish
(Build HTML for all pages of site)

Build a
Normal Page

Build a Stacked Page

Create initial HTML

Build an HTML Table

Generation of HTML for an HTML table in accordance with matrix

3602 — 
```
<P> <A HREF = netobjects homepge URL>
    <IMG SRC=link image\ BORDER=0>
    </A>
</P>
</BODY>
</HTML>
```

Generate final HTML
Fig. 36

| Object # | Start | Start + Length | | Object # | Start | Start + Height |
|---|---|---|---|---|---|---|
| 1 | 10 | 100 | | 1 | 80 | 95 |
| 2 | 30 | 40 | | 2 | 20 | 25 |
| 3 | 60 | 75 | | 3 | 10 | 70 |
| 4 | 30 | 40 | | 4 | 65 | 70 |

⬇ Sort and remove duplicates        ⬇ Sort and remove duplicates

Column Edges: 10, 30, 40, 60, 75, 100 — 6 column edges

Row Edges: 10, 20, 25, 65, 70, 80, 95 — 7 row edges

⬇ Determine width of each column        ⬇ Determine height of each row column widths (1 ... 7)

row heights (1 ... 8)

HIERARCHICAL DRAG AND DROP STRUCTURE EDITOR FOR WEB SITES

CROSS-REFERENCE TO RELATED APPLICATION

This application is a continuation application of U.S application Ser. No. 10/263,124, filed on Oct. 2, 2002, now U.S. Pat. No. 7,246,307 which is a continuation of U.S. patent application Ser. No. 09/158,644, filed on Sep. 22, 1998, abandoned, which is a continuation of U.S. patent application Ser. No. 08/687,971, filed on Jul. 29, 1996, and issued as U.S. Pat. No. 5,911,145 on Jun. 8, 1999 the contents of which are incorporated herein by reference in their entirety. This application also incorporates by reference U.S. patent application Ser. No. 08/687,974, filed on Jul. 29, 1996, and issued as U.S. Pat. No. 5,845,299 on Dec. 1, 1998.

APPENDIX

Appendix A provides an example of computer code for a draw object for text and a draw object for an image. This Appendix forms a part of the specification and is herein incorporated by reference.

FIELD OF THE INVENTION

This application relates to the World Wide Web and, in particular, to a method and apparatus for managing elements of a World Wide Web site having multiple pages.

BACKGROUND OF THE INVENTION

The past several years have seen an explosive growth of the World Wide Web ("the Web"). The Web is built around a network of "server" computers, which exchange requests and data with each other using the hypertext transfer protocol ("http"). A human designer designs the layout of a Web page, which is then specified using HTML ("Hypertext Markup Language"). Several versions of HTML are currently in existence. Examples include HTML versions 2.0 and 3.0, as specified by the WWW Consortium of MIT. Netscape Communications Corp. has specified additional HTML features that extend the HTML language, including forms and tables.

A user views a Web page using one of a number of commercially available "browser" programs. The browser submits an appropriate http request to establish a communications link with a Web server of the network. A typical http request references a Web page by its unique Uniform Resource Locator ("URL"). A URL identifies the Web server hosting that Web page, so that an http request for access to the Web page can be routed to the appropriate Web server for handling. Web pages can also be linked graphically to each other.

The HTML to describe a Web page is often created by hand by a human being. If the design of the page changes, the corresponding HTML must be rewritten, which is an exacting process. Although several conventional HTML editors exist, these editors only allow the user to specify certain elements of a page and still require the user to enter HTML code. Conventional HTML editors allow the user to specify the page content and general layout, but do not provide the user with "What You See Is What You Get" (WYSIWYG) capability. Thus, the pages generated by conventional HTML editors look different when viewed by different browsers.

A Web "site" consists of a "homepage" and several other related pages. Each page has corresponding HTML that describes the appearance and function of the page. For example, the HTML for the homepage usually contains links to one or more of the other pages and the other pages often contain respective links back to the homepage. When the user clicks on a link of the displayed homepage, the browser requests and displays the linked-to page. Each link must be designed and coded into the HTML for the page. Thus, for example, when a human designer decides to remove a link between the homepage and another page, the HTML for the homepage must be changed to reflect the removed link. This process is exacting and requires that the user manually change the link. Moreover, if the linked-to page has another link back to the homepage, that link may also need to be changed.

It is usually desirable to have a consistent style for all pages of a site. When the user hand codes the HTML for each page of a site, it is difficult for the user to remember to use a consistent style. In addition, if the user decides to change the style of a site, each page must be changed individually.

SUMMARY OF THE INVENTION

The present invention overcomes the problems and disadvantages of the prior art by using a "top-down" approach to designing a Web page. The user can use a "drag and drop" interface to move icons representing Web pages into a desired hierarchy of pages for the site. The hierarchy can, but does not necessarily represent links between the pages of the site.

The user drags and drops display elements to define the hierarchy of the site and to define the layout of each page in the site. The present invention automatically generates a layout for each page. This layout contains display elements that represent the links between pages of the site. Thus, the user does not have to manually specify links for each page. As the user drags and drops icons to add, move, and delete pages of the site hierarchy, the present invention will automatically add, remove, and delete the appropriate links between the pages of the site. A preferred embodiment also automatically creates a banner across the top of each page that contains a user-specified page name.

After the user has defined the hierarchy of the site and the layout of each page in the site, the user "publishes" the site. The publish function automatically generates HTML for each page of the site in accordance with the display elements of each page. In the described embodiment of the present invention, the publish function generates an HTML table for each page. The number of cells in each table reflects the number and placement of display elements on a corresponding page, yielding a true WYSIWYG page for the site.

In accordance with the purpose of the invention, as embodied and broadly described herein the invention is a method of allowing a user to define a World Wide Web site having a plurality of pages with a hierarchical organization comprising the steps, performed by a data processing system, of: receiving an indication that the user wants to add a new page at a position in the site hierarchy; adding a page data structure for the new page to a tree of other page data structures reflecting the site hierarchy, where the page data structure is added in accordance with the position of the new page in the site hierarchy; and automatically creating in the memory a layout data structure for the new page, the layout data structure having a link in accordance with the position of the new page in the site hierarchy.

In further accordance with the purpose of this invention, as embodied and broadly described herein the invention is a method of allowing a user to define a World Wide Web site having a plurality of pages with a hierarchical organization comprising the steps, performed by a data processing system of: displaying a plurality of page icons in a hierarchical fashion, on a display device where the hierarchy of the page icons reflects the hierarchical organization of the pages; receiving an indication that the user has dragged one of the page icons in the site hierarchy from an old position to a new position; displaying, in accordance with the new position, an indicator on a second page icon indicating—where the new page icon would be added in the site hierarchy; receiving an indication that the user wants to move the new page to the new position; removing the page icon from the old position on the display device; displaying the page icon in proximity to the indicator; and moving a page object, corresponding to the moved page icon, within a tree structure in accordance with the new position of the moved page icon.

Advantages of the invention will be set forth in part in the description which follows and in part will be obvious from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 7 shows a format of a page object corresponding to a page in the site.

FIG. 25 is an example of a draw object for a page banner.

FIGS. 26(a) and 26(b) are examples of a draw object for a navigator button.

FIG. 27 is an example of a draw object for a text navigator button.

FIG. 36 is an example of steps performed by the structure editor to generate final HTML for a site.

DETAILED DESCRIPTION

Reference will now be made in detail to a preferred embodiment of the invention, an example of which is illustrated in the accompanying drawings. Wherever possible, the same reference numbers will be used throughout the drawings to refer to the same or like parts.

I. System Overview

Figure 1:
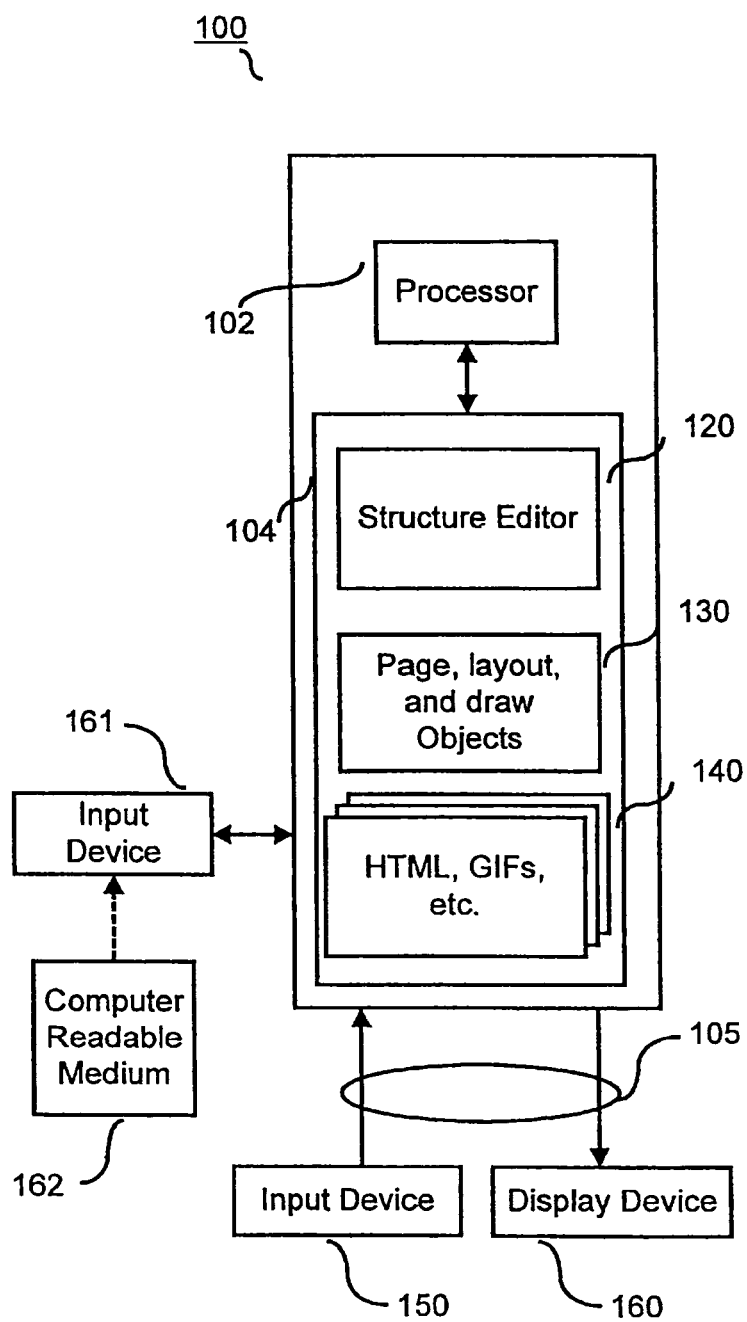
FIG. 1 is a block diagram of a computer system in accordance with a preferred embodiment of the present invention.

FIG. 1 is a block diagram of a computer system 100 in accordance with a preferred embodiment of the present invention. Computer system 100 includes a CPU 102; a memory 104; input/output lines 105; an input device 150, such as a keyboard or mouse; and a display device 160, such as a display terminal. Computer 100 also includes an input device 161, such as a floppy disk drive or CD ROM reader, that reads computer instructions and data stored on computer readable medium 162, such as a 'floppy disk or a CD ROM. These computer instructions are the instructions of e.g., structure editor software 120. Memory 104 includes structure editor software 120, page objects, layout objects, and draw objects 130, HTML 140, and image files 140, etc., as described in further detail below.

A person of ordinary skill in the art will understand that memory 104 also contains additional information, such as application programs, operating systems, data, etc., which are not shown in the figure for the sake of clarity.

It also will be understood that computer system 100 can also include numerous elements not shown in the Figure for the sake of clarity, such as disk drives, keyboards, display devices, network connections, additional memory, additional CPUs, LANs; internet connections, input/output lines, etc.

II. Site Creation and Manipulation

The following paragraphs describe how the user creates a hierarchy of pages for a site. It will be understood that all flow charts in this document represent steps performed by processor 102 executing instructions of structure editor software 102.

Figure 2:
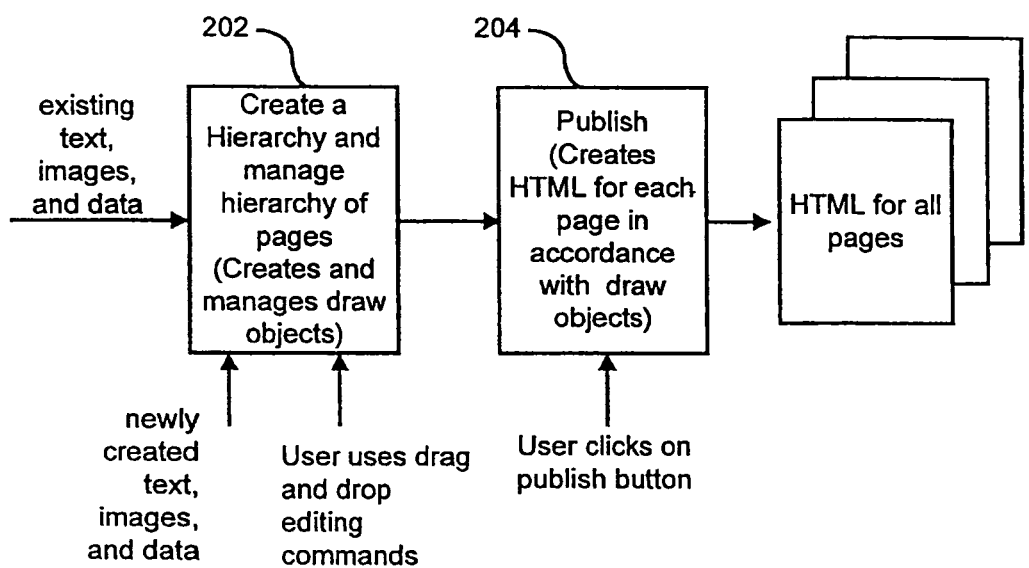
FIG. 2 is a block diagram showing input and output to structure editor software of FIG. 1.
Figure 3:
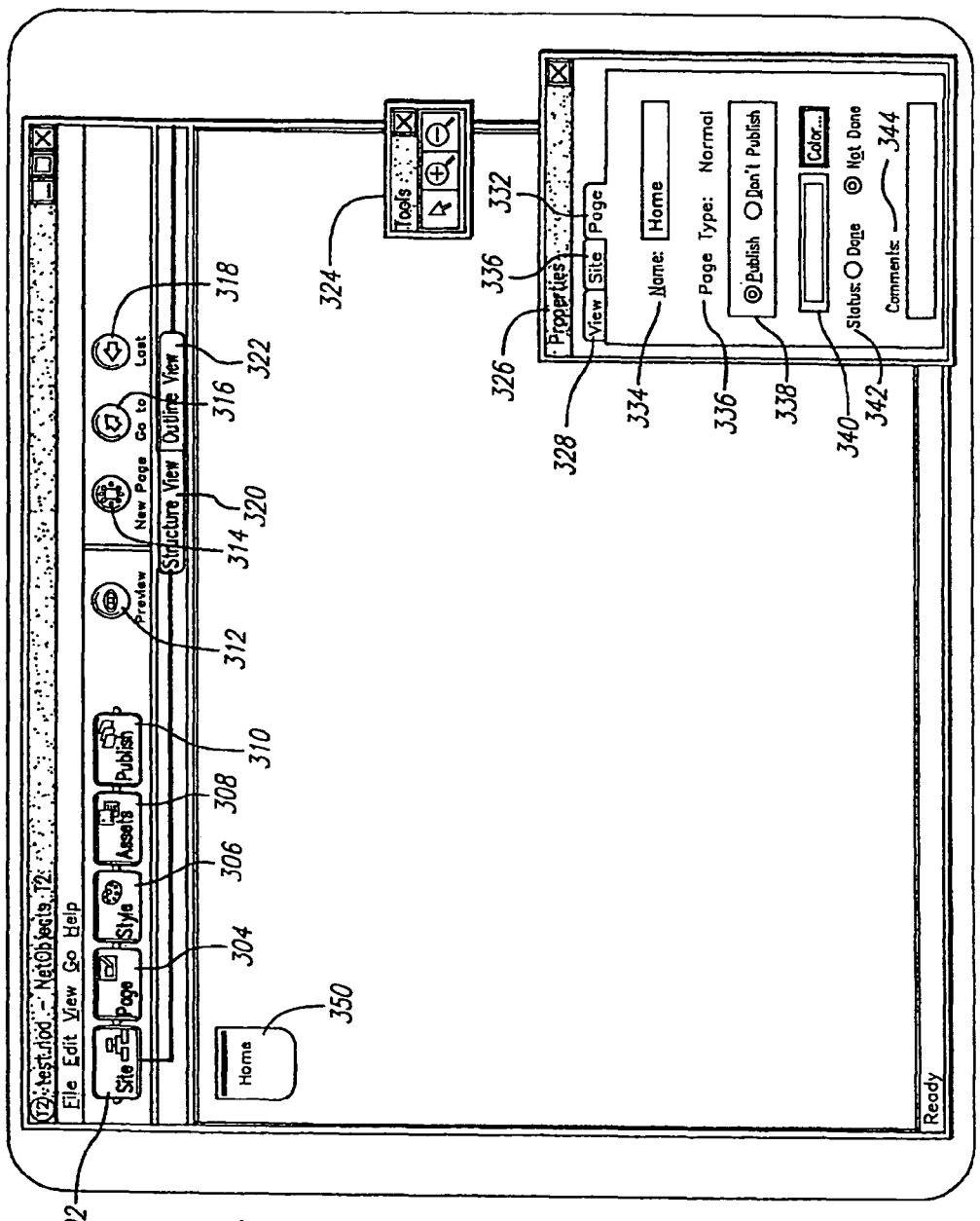
FIG. 3 shows a first display on a display device generated in accordance with the embodiment of FIG. 1, where the display shows all pages of a Web site.

FIG. 2 is a block diagram showing input and output to structure editor software 120 of FIG. 1. Structure editor 120 includes a portion 202 that creates and manages a hierarchy of pages and a portion 204 that publishes the pages of the site. The user uses a drag and drop interface to define the hierarchy of the site. Pages in the site can include new text and images or preexisting text and images. The user initiates publish portion 204 by clicking on a "publish" button as described below. Publish portion 204 generates a plurality of HTML pages, as described below. Each page includes one or more HTML tables that yields a WYSIWYG Web page. FIG. 3 shows a "site view" displayed on display device 160. In the described embodiment, the display of FIG. 3 is displayed by processor 102 upon beginning execution of structure editor software 120. The site view of FIG. 3 is also displayed when the user selects Site button 302. FIG. 3 shows that the software automatically creates a node representing a "Home" page and displays an icon 350 corresponding to the home page node.

The display of FIG. 3 includes a plurality of buttons: a "Site" button 302, a "Page" button 304, a "Style" button 306, an "Assets" button 308, and a "Publish" button 310. The display also includes a "Preview" button 312, a "New Page" button 314, a "Goto" button 316, and a "Last" button 318. Each of buttons 302-314 are discussed below in turn. The Goto and Last buttons 316, 318 transfer control to a most recent display or a user-selected previous display, in a manner known to persons of ordinary skill in the art. The described embodiment keeps a "history" of execution of structure editor 120 in order to implement the Goto and Last buttons.

Figure 4:
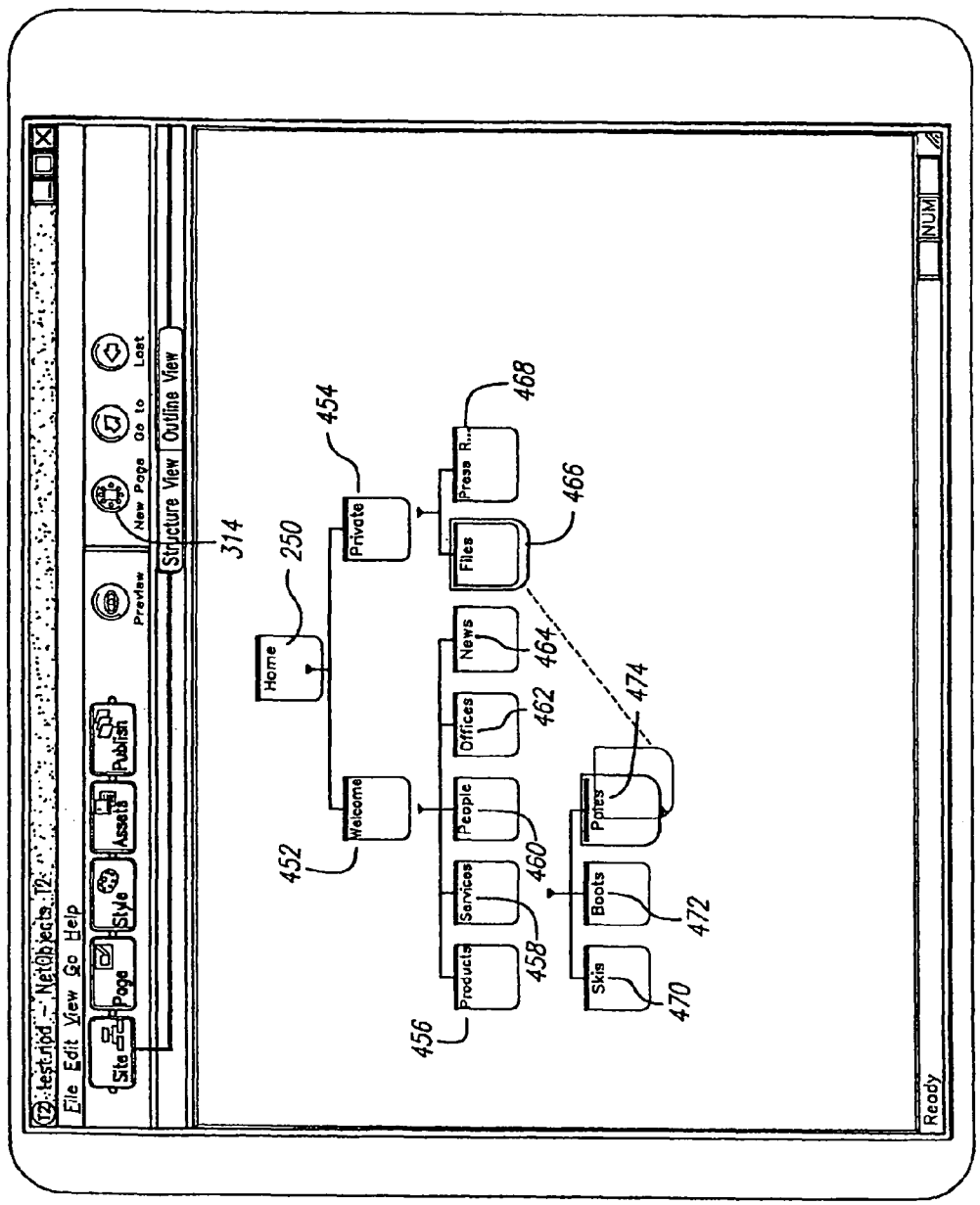
FIG. 4 shows a second display on a display device generated in accordance with the embodiment of FIG. 1, where the site has multiple pages added and one page has been moved from its original position.
Figure 6:
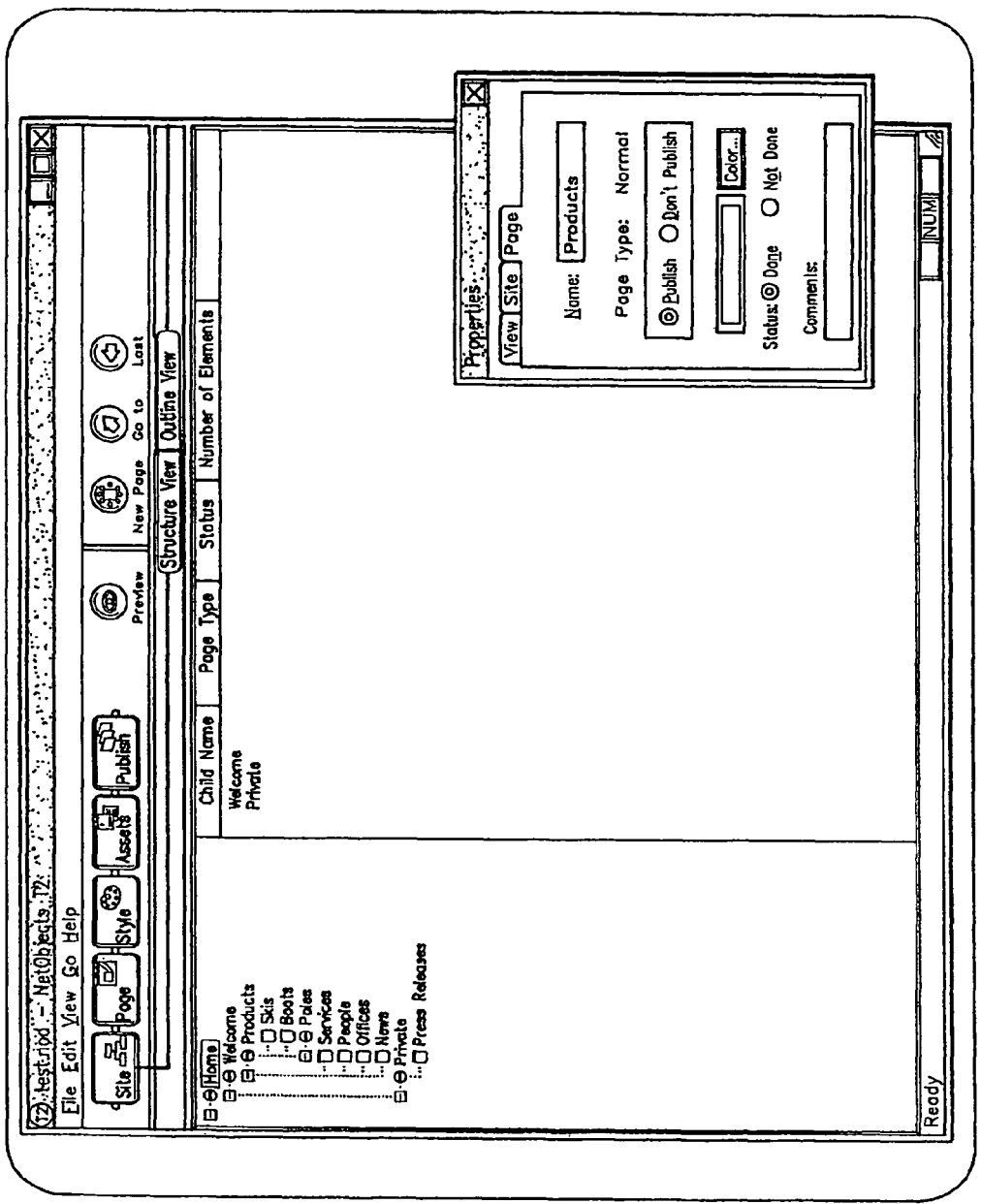
FIG. 6 shows an alternate display for the objects of FIG. 5(b).

The display of FIG. 3 further includes a "Structure View" toggle 320 and an "Outline View" toggle 322. When the user clicks on Structure View toggle 320, a display having a format of FIGS. 3 and 4 are displayed. When the user clicks on Outline View toggle 322, a display having a format of FIG. 6 are displayed. The user can drag and drop page icons in either the Structure view or the Outline view.

The display of FIG. 3 further includes a "Tools" window 324. Tools window 324 includes a "cursor" tool, and "zoom in" and "zoom out" tools, as are known in the art. Depending on the implementation used, windows are also called "dialog boxes."

The display of FIG. 3 further includes a "Properties" window 326. Properties window 326 includes three tabs: a "View" tab 328, a "Site" tab 330, and a "Page" tab 332. Properties window currently shows page properties because page tab 332 is selected. Properties window 326 includes a "Name" area 334, a "Page Type" area 336, a "Publish/Don't Publish" area 338, a "Color" area 340, a "Status" area 342, and a "Comments" area 344.

The user can "select" a page icon, such as page icon 350, in a manner known to person of ordinary skill in the art. When a page icon is selected, the values shown in Properties window 326 are values for the selected page. Thus, in FIG. 3, when "Home" page icon 350 is selected, the name field in Properties window 326 is "Home." The page type is "normal." ("Stacked pages" are discussed below). The user has indicated that the page should be published during the Publish function. (The user also can indicate that the page should not be published during the publish function). The color of page icon 350 is the color indicated in Color area 340. (Note that this is different from the background color of the page itself.) The user has indicated that the status of the page is "not done." The user has not entered any comments about the page. It will be understood by persons of ordinary skill in the art that structure editor software 120 stores values corresponding to Properties window 326 and for each Properties window and Properties tab discussed herein in memory 104.

FIG. 4 shows a second display on a display device generated in accordance with the embodiment of FIG. 1, where the user has added multiple pages to the site and one page has been moved from its original position. In FIG. 4, the user has added page icons 452-474 by selecting (e.g., clicking) on New Page button 314 for each new page icon added. Each new page icon represents a new page added to the site hierarchy. The site hierarchy uses a "tree" structure. Each branch of the tree represents a "logical" (or "structural") connection between two pages. As discussed below, these logical connections may also represent links between the pages, but do not necessarily represent such links. Moreover, links between pages may exist that do not represent branches of the site hierarchy.

Figure 17:
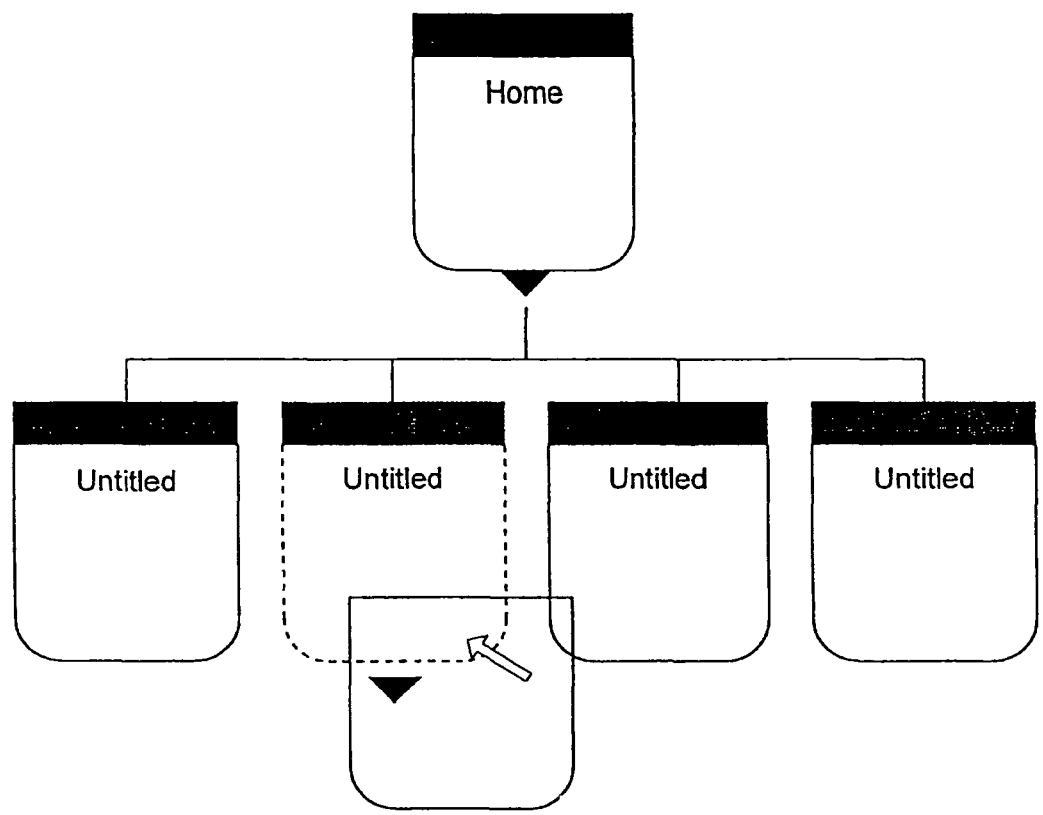
FIG. 17 shows an example of adding a child page to the site.

FIG. 4 shows a display after the user has selected page icon "Files" 466 and dragged page icon 466 on top of page icon 474. The dotted line in FIG. 4 indicates the path of the dragged page icon, but is not displayed. In the described embodiment, page icon 466 is highlighted when it is selected. When a page icon is dragged, it is represented by a dotted outline of a page icon (not shown). As shown in FIG. 4, when the user drags a first icon on top of a second icon, the first icon is displayed with an arrow indicating where the second page icon will connect to the first page icon. Thus, in FIG. 4, if the user drops page icon 466 on top of page icon 474 (and slightly below icon 474), page icon 466 will be displayed as "child" of page icon 474 (and removed from its previous display location). FIG. 17 shows another example of moving a page icon so that it becomes a child icon.

Figure 18:
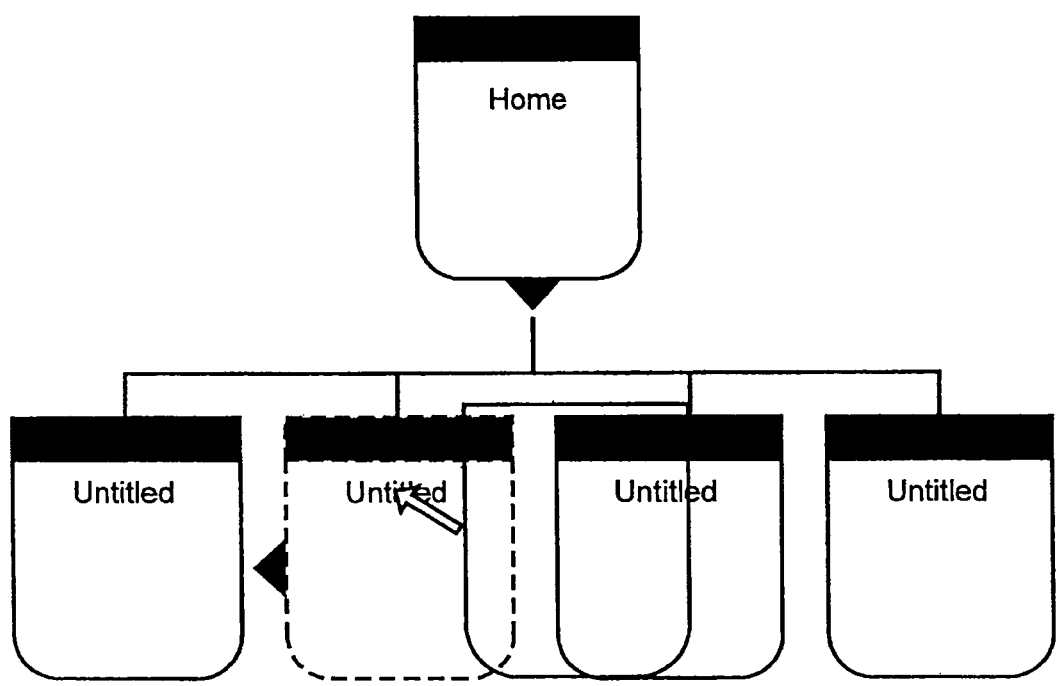
FIG. 18 shows an example of adding a sibling page to the site.

FIG. 18 shows an example of moving a page icon so that it becomes a sibling page icon. If, in FIG. 4, page icon 466 was moved to the left side of icon 474 instead of to the bottom, an arrow would appear on the left side of icon 474, indicating where the page icon 466 will connect to page icon 474 if it is dropped. Thus, in FIG. 4, if the user drops page icon 466 on top of page icon 474 (and slightly to the left, not shown), page icon 466 will be displayed as "sibling" of page icon 474 (and removed from its previous display location).

Figure 5A:
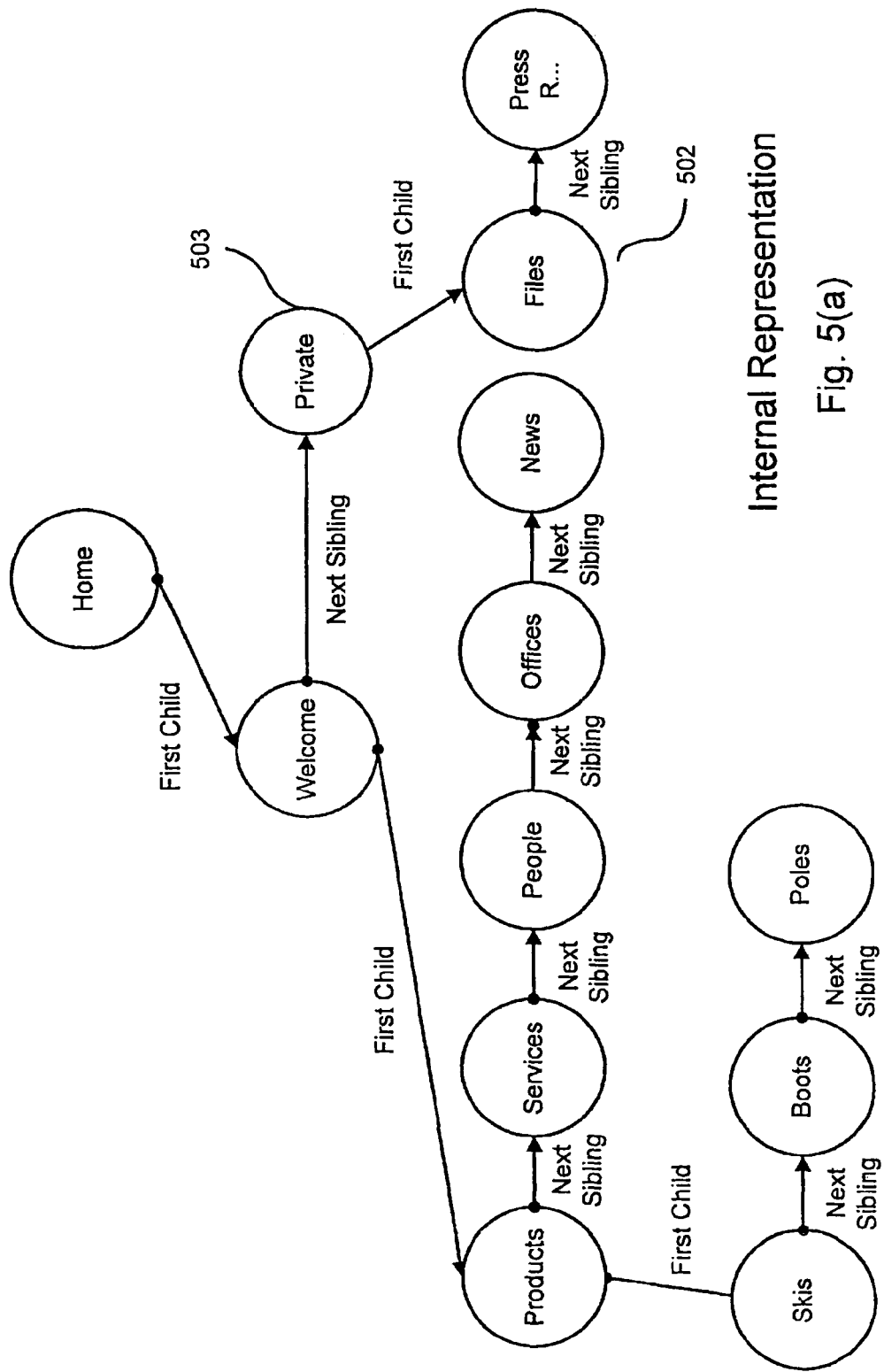
FIG. 5(a) show an example of an internal representation of page objects corresponding to the pages of FIG. 3 before the page is moved.
Figure 5B:
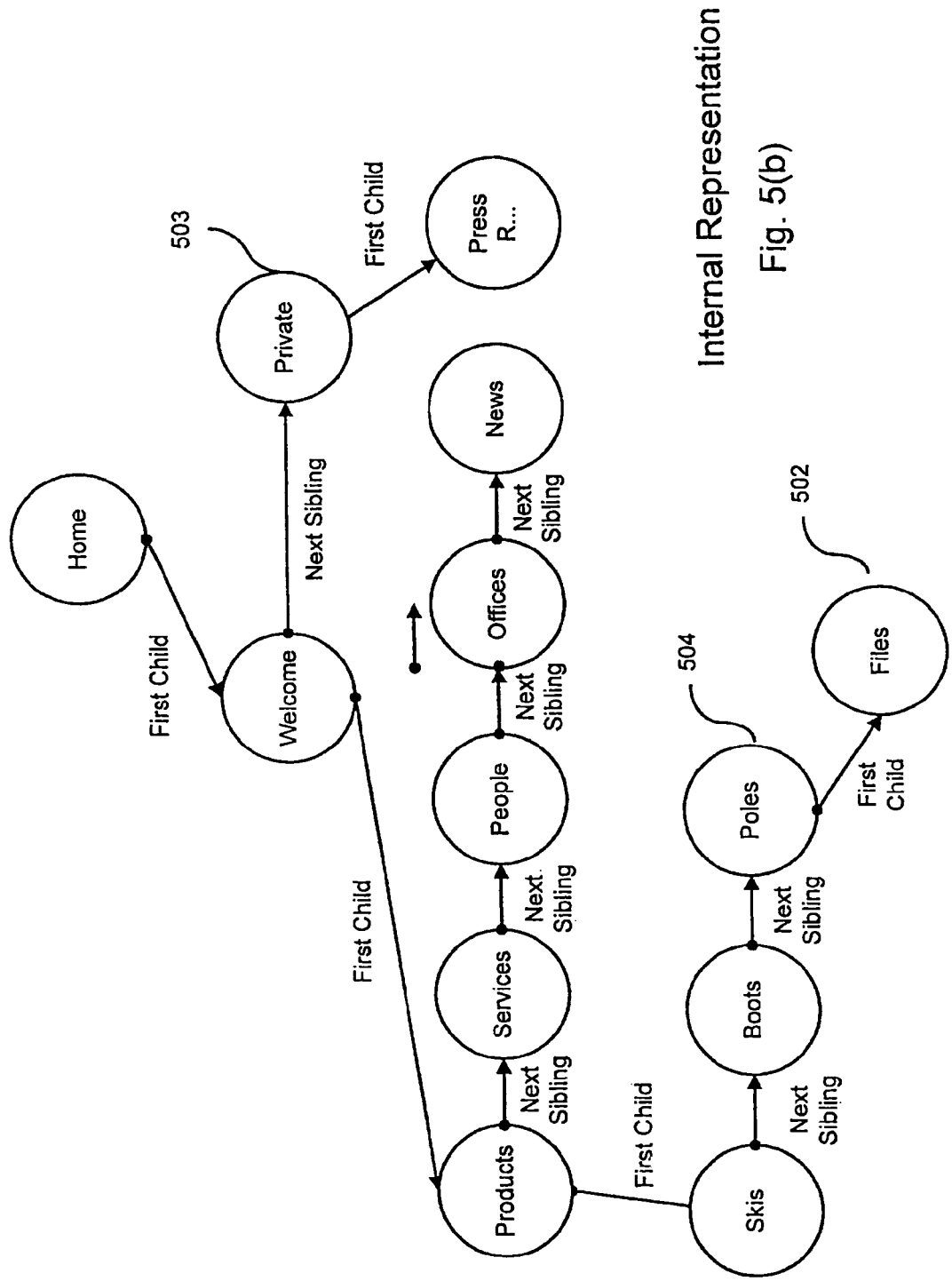
FIG. 5(b) show an example of an internal representation of objects corresponding to the page objects of FIG. 4 after the page is moved.

FIG. 5(*a*) show an example of an internal representation of page objects corresponding to the page icons of FIG. 4 before page icon 466 is moved. Page objects and page icons are also called "nodes." The page objects of FIG. 5(*a*) form a tree data structure in memory 104. Page object 502 is a child of a "Private" page object 503, since page icon 466 is a child of "Private" page icon 454. In the tree of FIG. 5(*a*), each node has zero or one "first children." Other children of the node are indicated as "next siblings" of the first child.

FIG. 5(*b*) show the internal representation of page objects corresponding to the page icons of FIG. 4 after page icon 466 is moved. Page object 502, which corresponds to page icon 466, is a child of page object "Poles" 504 since page icon 466 has been moved to be a child of "Poles" page icon 474.

FIG. 7 shows a format of a page object 700. Each page object of FIGS. 5(*a*) and 5(*b*) has this format. FIG. 7 shows only the information in the object, not the size or type of the information. Page object 700 includes an object number, an object type, an object name (e.g., "Products"), a collection number (currently unused), a number of a parent node/page, a next sibling number, a first child number, a pointer to a list of draw objects in a current layout of the page (discussed below), a flag indicating whether the page is a stacked page, a flag indicating whether the page is currently expanded on the display, a flag indicating whether the page is currently collapsed on the display, a flag indicating whether the page should be published when the site is published, a color of the page icon for the page, a status (e.g., "done," "not done"), and user-entered comments.

Figure 8:
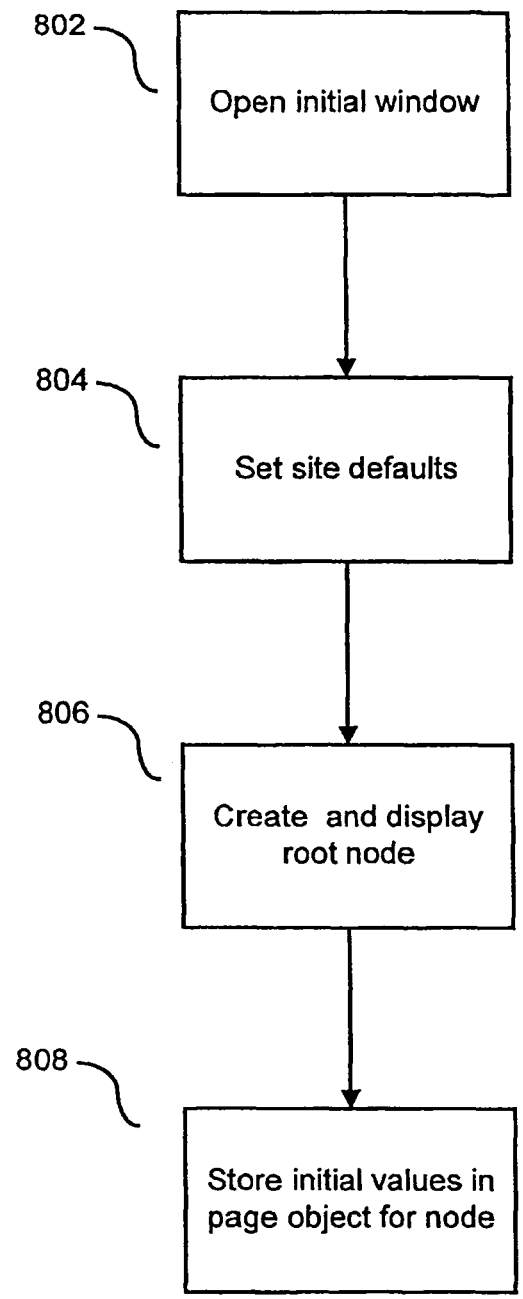
FIG. 8 is a flow chart showing initialization steps performed by the structure editor software.

FIG. 8 is a flow chart showing initialization steps performed by structure editor software 120 upon execution. Step 802 opens the initial window of FIG. 3. Step 804 sets default values for the site in memory 104. These default values include a style of the layout, header, and footer, as discussed below. Step 806 creates and displays a page object for the homepage (root node) of the site in memory 104. The created page object has a format shown in FIG. 7 and has no parent node. Step 808 stores default initial values in the root page object.

In the described embodiment, the default name is "Home". The default class is node. The default parent number, sibling number, and first child number is "0". The default layout includes a banner having the default name "Home". The stacked flag defaults to "false." The expanded flag and the publish flag default to "true." The color of the page icon defaults to a predetermined page icon color. Alternately, the each level of page icon defaults to a different predetermined color. The status defaults to "not done". The comments default to <null>.

Figure 9:
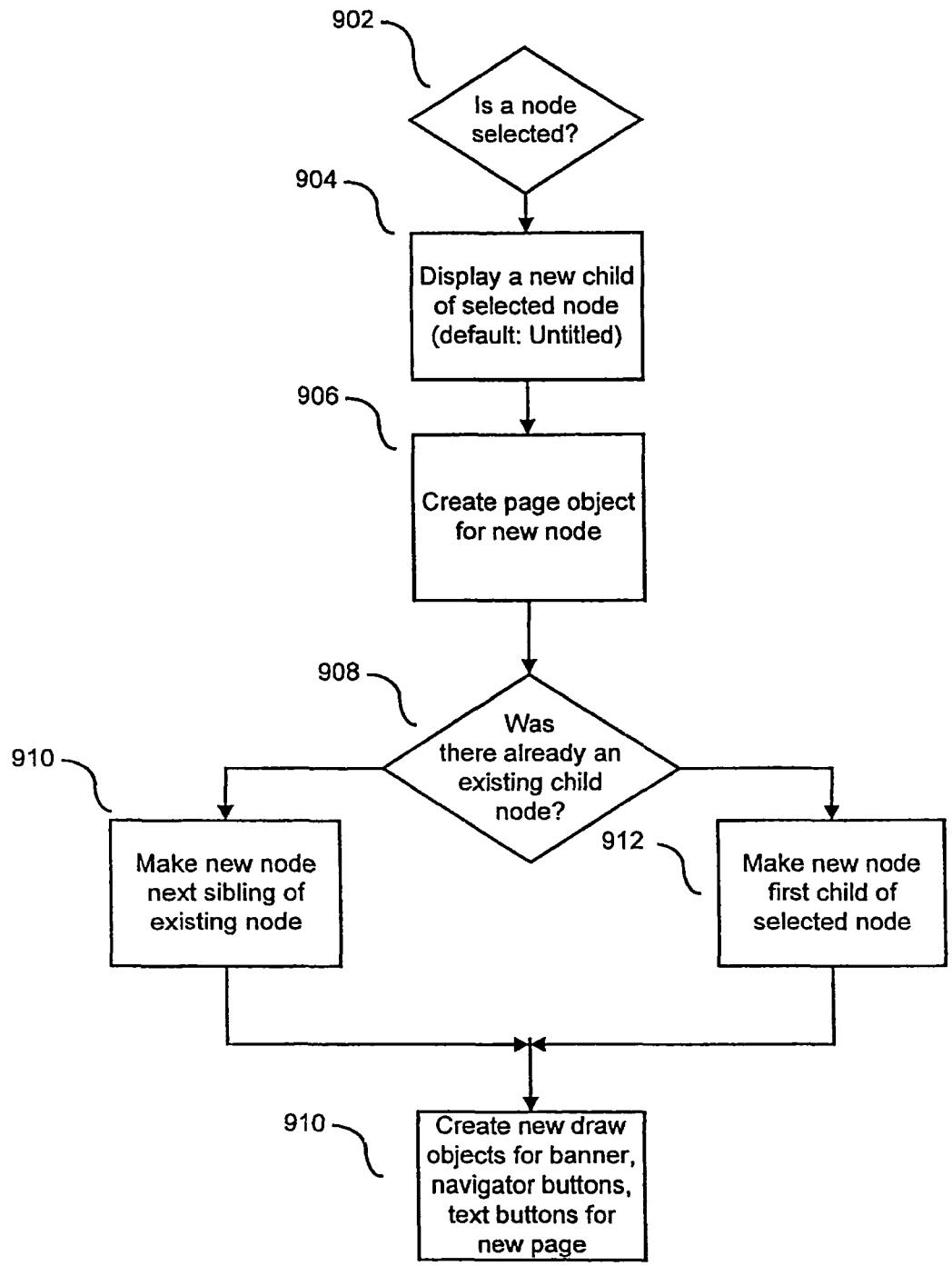
FIG. 9 is a flow chart showing steps performed by the structure editor software to create a new page in the site.

FIG. 9 is a flow chart showing steps performed by structure editor software 120 to create a new page in the site. The steps of FIG. 9 are performed when the user selects New Page button 314 of FIG. 3. If, in step 902, the user has previously selected a page icon (also called a "node"), then processor 102 displays a new child page icon of the selected page icon in step 904. Step 906 creates a page object in memory for the new page. If the selected node already has an existing child then, in step 910, the new node is made a next sibling of the existing child node. Otherwise, in step 912, if the selected node has no children, then the new node is made a first child of the selected node. In the described embodiment, a new page is always a normal page. Creation of stacked pages is discussed in the copending application.

Figure 43:
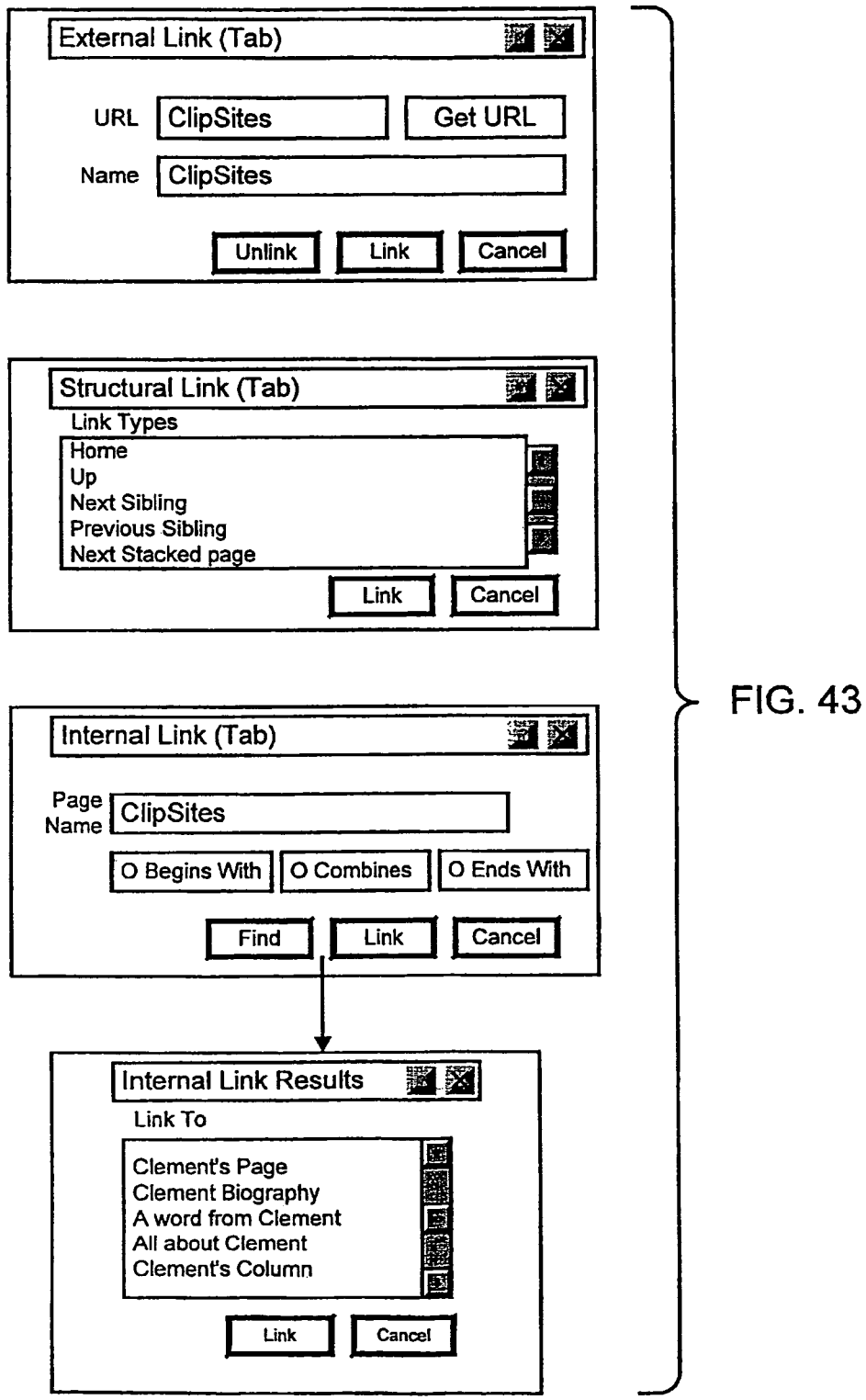
FIG. 43 shows an example of a plurality of link dialog boxes, showing a structural link, an internal link, and an external link.

In the described embodiment, whenever a new page is created, new draw objects are automatically created for that page. These draw objects represent links in the page layout to other nodes in the site. Currently links are created in the header and the footer of the new page to the homepage, to the parent node, and to the "first level nodes" (i.e., to children of the homepage). Links can also be generated for (future) children of the new page. The described embodiment automatically creates "structural links." A draw object is created for each link. A structural link represents a link to a node having a certain place in the site hierarchy, not a link to an absolute page. Thus, a page can contain a structural link to a sibling page. The actual identity of the sibling page is not determined when the draw object for the link is created. The identity of the link is created when the page containing the link is displayed, previewed or published. FIG. 43 shows an example of a plurality of dialog boxes for different types of links.

Figure 10:
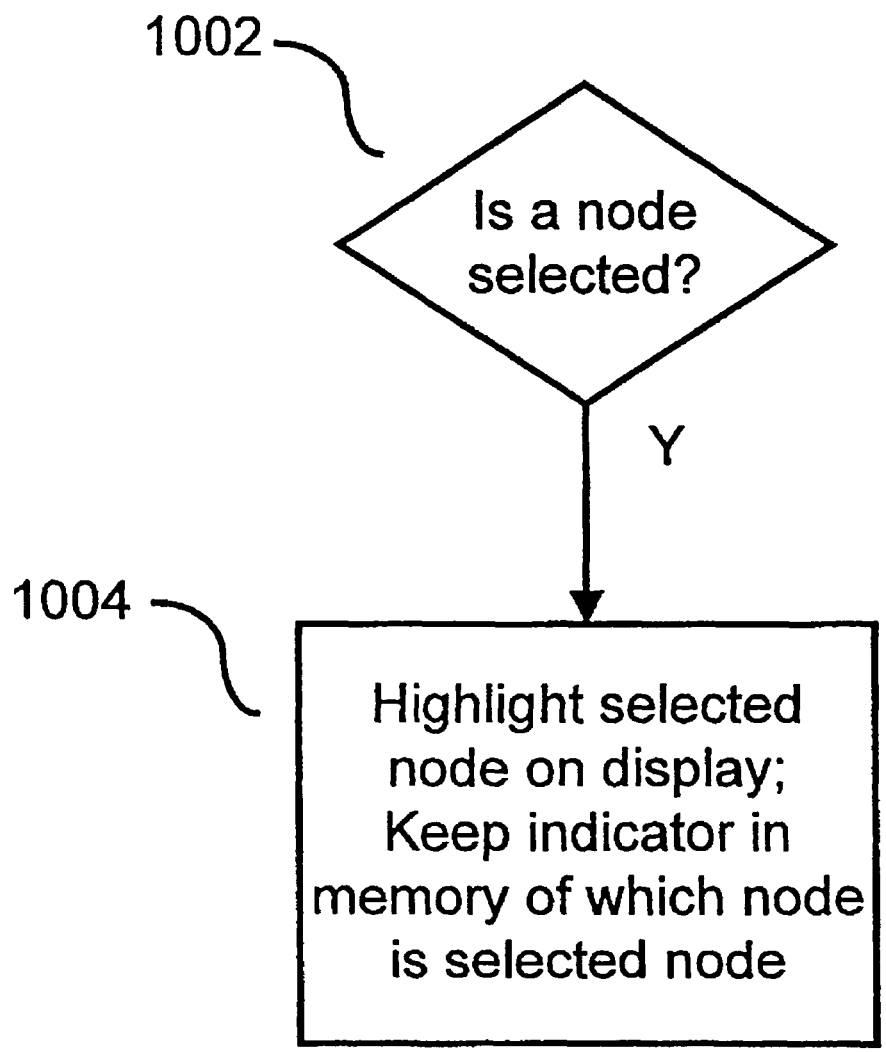
FIG. 10 is a flow chart showing steps performed by the structure editor software when the user selects a node.

FIG. 10 is a flow chart showing steps performed by structure editor software 120 when the user selects a page icon/node. In step 1004, processor 102 displays the selected page icon in a predetermined color, or by drawing a line around the selected page icon, or by displaying some similar indication of selection. Processor 102 also sets a value in memory 104 indicating the current selected node.

Figure 11:
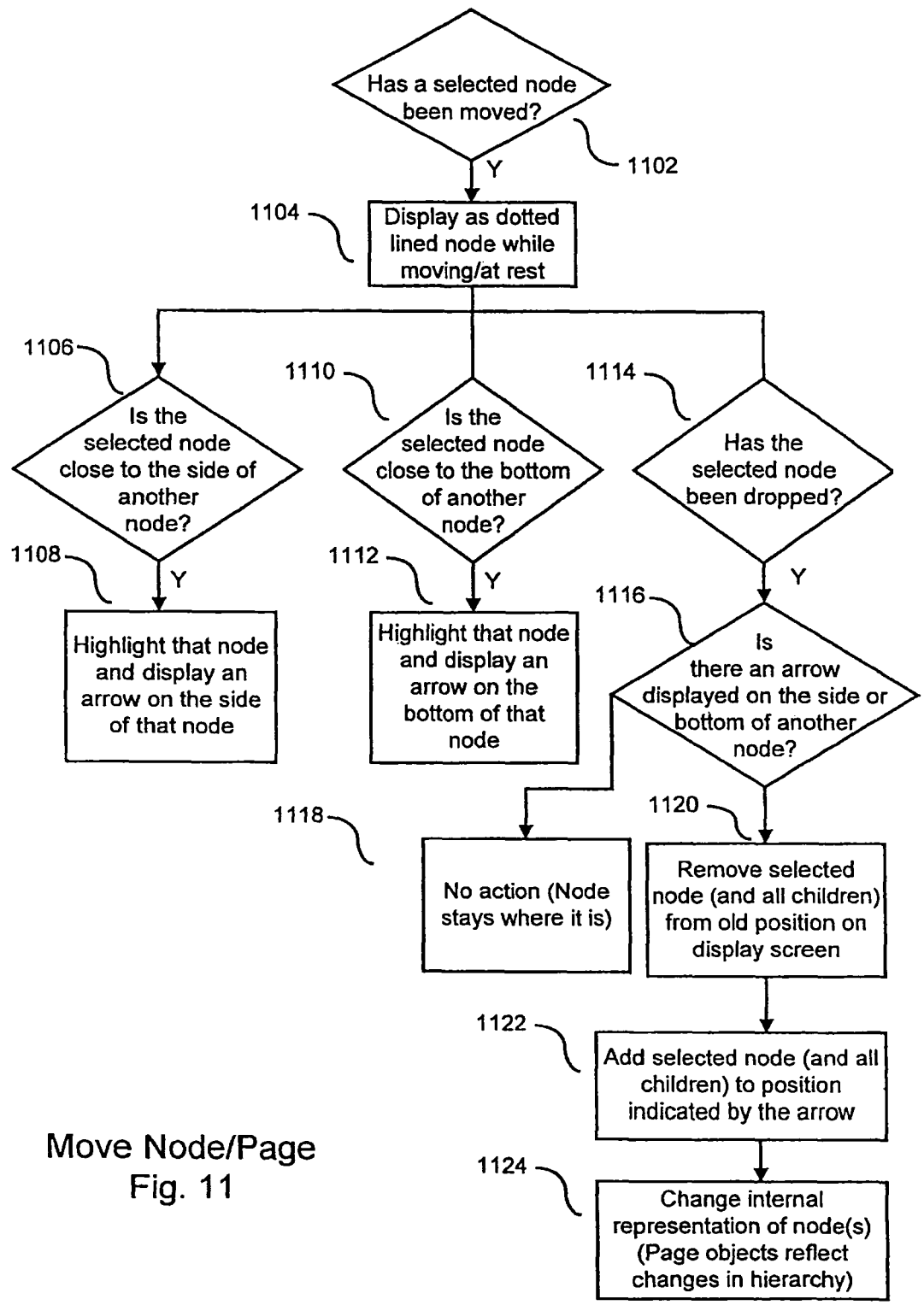
FIG. 11 is a flow chart showing steps performed by the structure editor software when the user moves a node.

FIG. 11 is a flow chart showing steps performed by structure editor software 120 when the user moves a node. Note that, in the described embodiment, the page icon for the homepage cannot be moved. In step 1104, the page icon is displayed as dotted line while it is moving. In step 1106, if the selected node is close to the side of another node then, in step 1108, the node is highlighted and an arrow is displayed on the corresponding side of that node. In step 1110, if the selected node is close to the bottom of another node then, in step 1112, the node is highlighted and an arrow is displayed on the bottom of that node.

In step 1114, if the selected node has been dropped, if the dropped node is not near another node (either side or bottom), then no action is taken. The user cannot drop a node so that it is not a part of the site. If the selected node has been dropped near another node (either side or bottom) then, in steps 1120 through 1126, the page icon/node is moved to a new position in the site hierarchy. Step 1120 removes the selected node (and all its children) from its old display position. Step 1122 adds the selected page icon/node (and all its children) to its new display position. Step 1124 changes one or more page objects in memory so that the page is correctly linked into its new position in the site hierarchy.

In an alternate embodiment, in step 1126, the draw objects of the selected page are altered so that when the selected page is displayed by a browser, the selected page contains links to its new parents, siblings, and/or children. The user may, of course, alter these draw objects if he so desires. The draw objects of the new parents and siblings are also changed so that a link to the moved page will be created.

Figure 12:
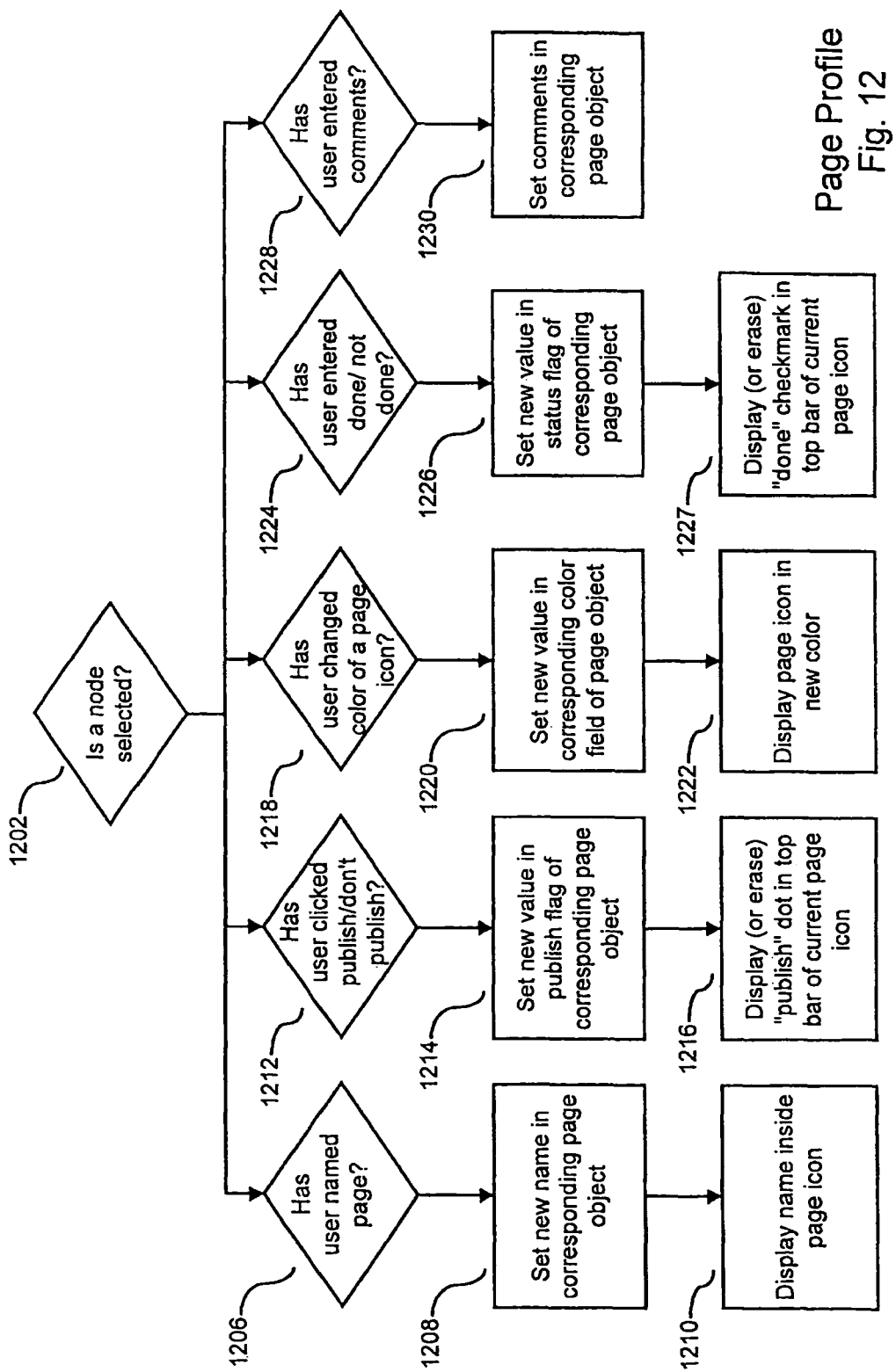
FIG. 12 is a flow chart showing steps performed by the structure editor software when the user changes the profile of a page.

FIG. 12 is a flow chart showing steps performed by structure editor software 120 when the user changes the profile of a page. The steps of FIG. 12 are performed when the user selects "Profile" from a pull down-view menu to display Profile window 326 of FIG. 3. In the described embodiment, the values in the profile window are the current values from the selected page icon/node. If the user enters a page name in step 1206 then, in step 1208, the name is stored in a corresponding page object having the format of FIG. 7. In step 1212, the new name is displayed in the page icon on the display. In an alternate embodiment, the name is changed in any existing draw objects for the selected page (i.e., banners, etc.). Moreover, if other pages link to the selected page, then the name is also changed in any other draw objects of those pages. If the page contains "smart links," the identity of the linked-to page is not determined until the page is displayed, previewed, or published.

If the user selects "publish" or "don't publish" in step 1212 then, in step 1214, the value of the publish flag is changed accordingly and, in step 1216, a dot indicating "publish" is displayed in the page icon. If the user changes the color of the selected page icon in step 1218 then, in steps 1220 and 1222, the color value in the corresponding page object is changed accordingly and the page icon is displayed in its new color.

Figure 13:
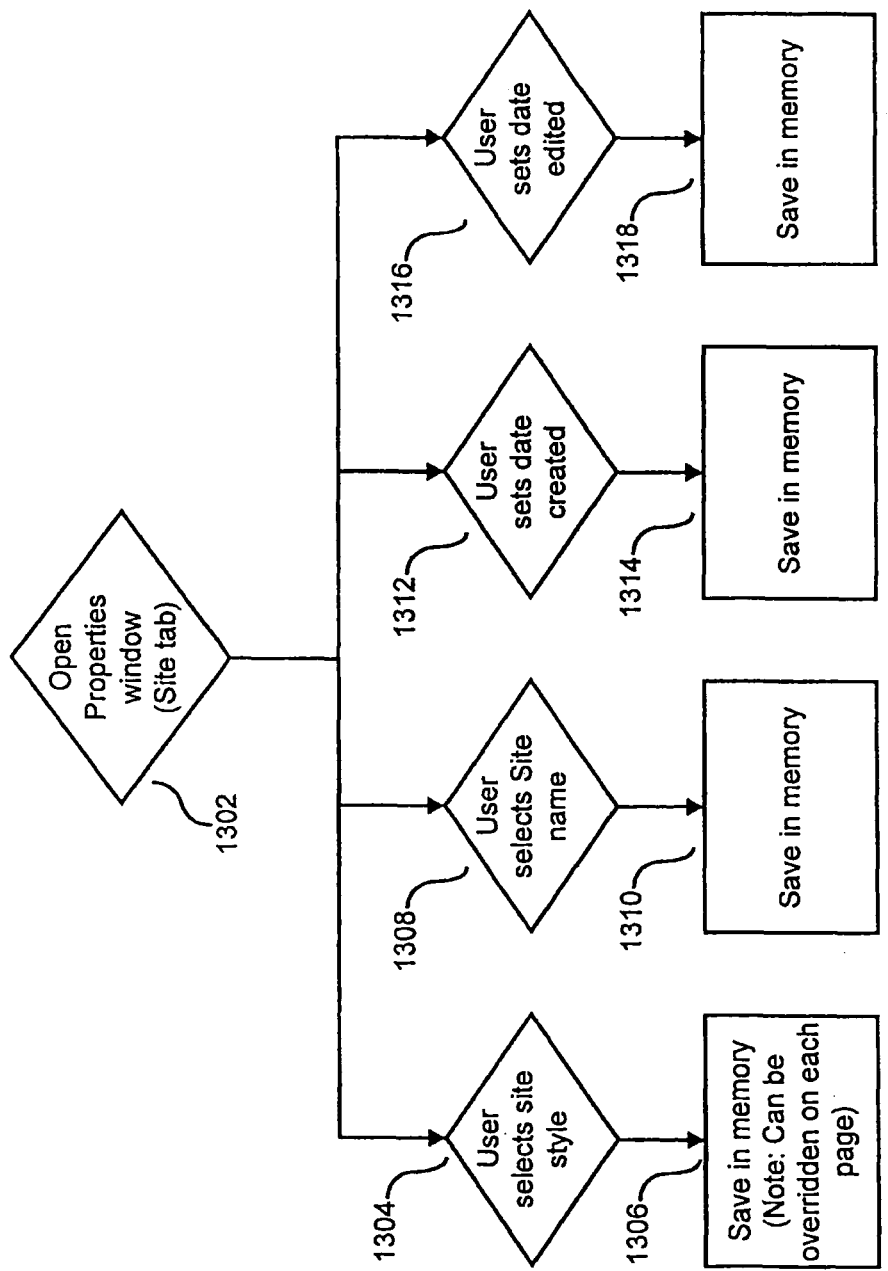
FIG. 13 is a flow chart showing steps performed by the structure editor software when the user changes a property of the site.

If the user selects "done" or "not done" in step 1224 then, in step 1226, the done flag in the corresponding page object is changed accordingly and a checkmark indicating "done" is displayed in the page icon. If the user has entered comments in step 1228 then, in step 1230, the comments in the corresponding page object are changed accordingly. FIG. 13 is a flow chart showing steps performed by structure editor software 120 when the user clicks on a Site tab of a site property window. The user can change the style and name for the site and save the creation and edit dates.

Figure 14A:
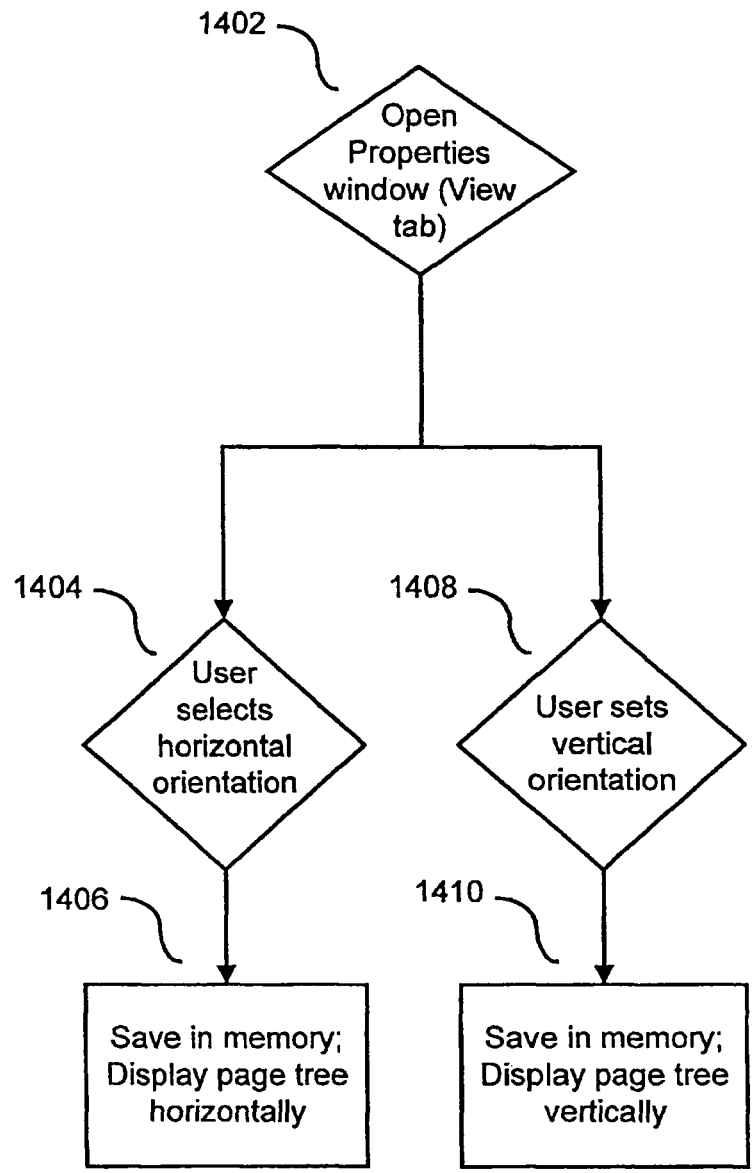
FIG. 14(a) is a flow chart showing steps performed by the structure editor software when the user changes a view of the site.
Figure 14B:
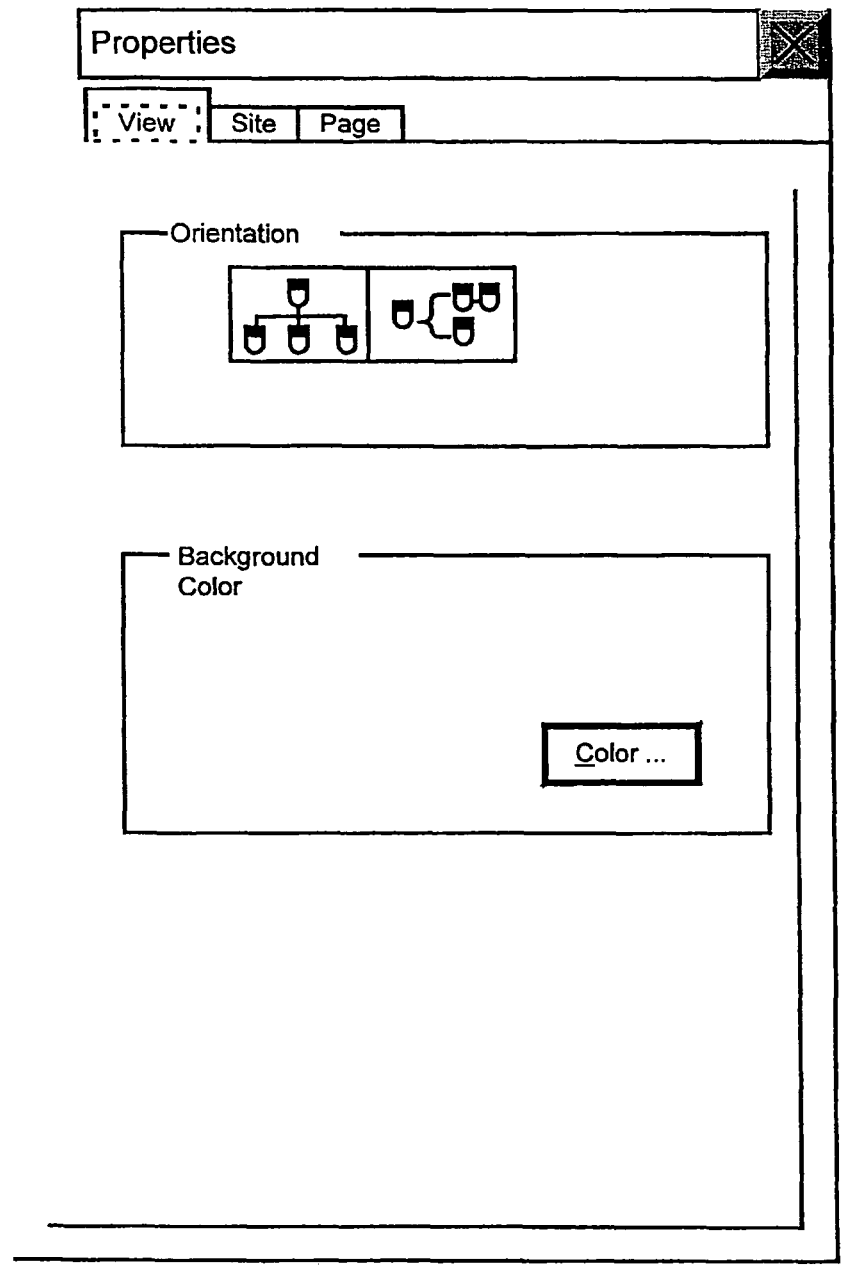
FIG. 14(b) shows an example of a View tab.
Figure 20:
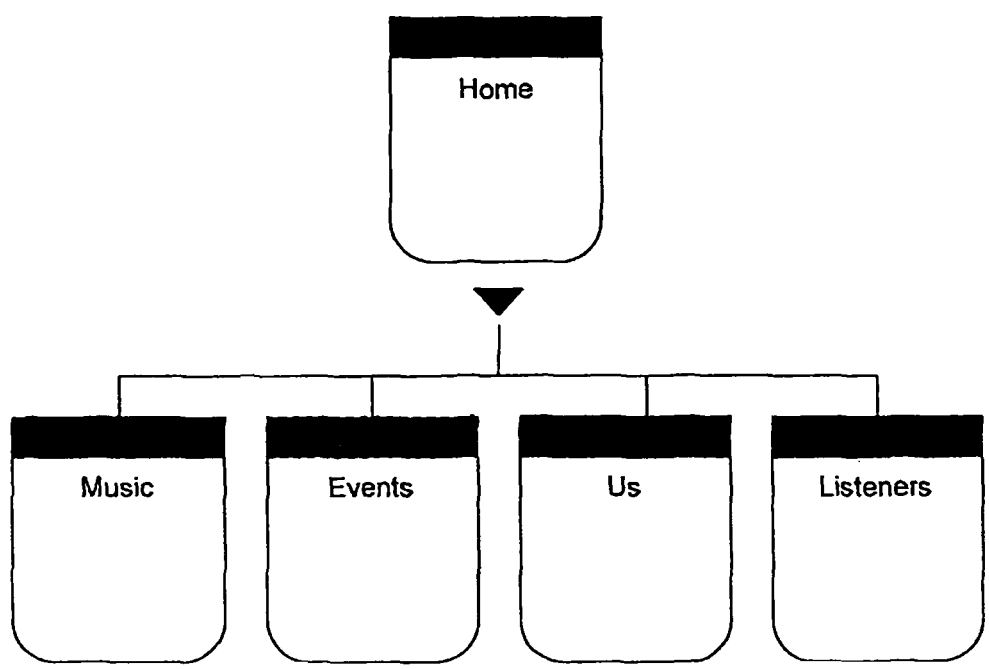
FIG. 20 shows an example of a horizontal display of pages of a site.
Figure 21:
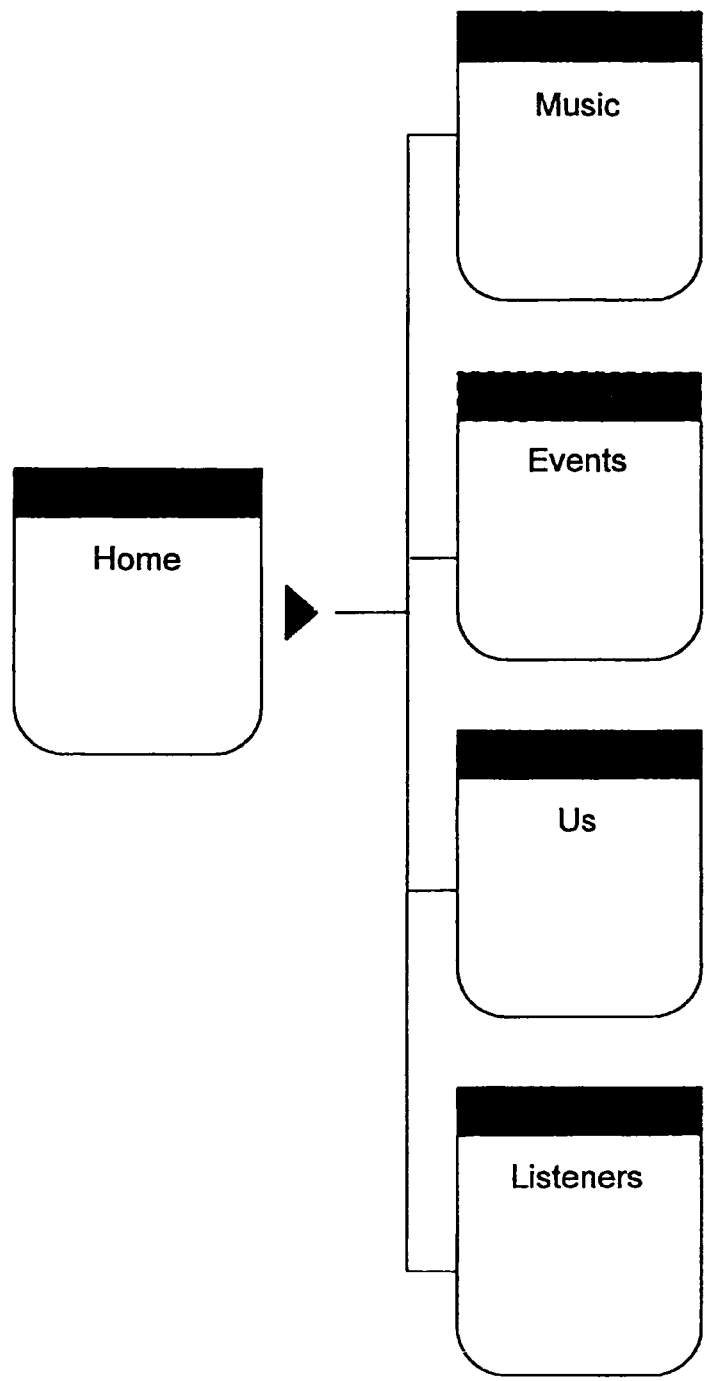
FIG. 21 shows an example of a vertical display of pages of a site.

FIG. 14(*a*) is a flow chart showing steps performed by structure editor software 120 when the user clicks on a View tab of a Site property window. The user can set the view to be either horizontal or vertical. FIG. 14(*b*) shows an example of a View Tab. FIG. 20 shows a horizontal view of the site hierarchy. FIG. 21 shows a vertical view of the site hierarchy.

Figure 15A:
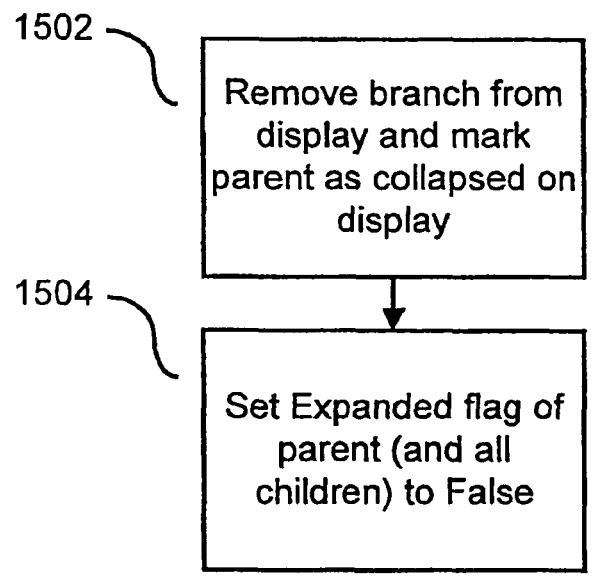
FIG. 15(a) is a flow chart showing steps performed by the is a flow chart showing steps performed by the structure editor software when the user changes a view of the site.
Figure 16:
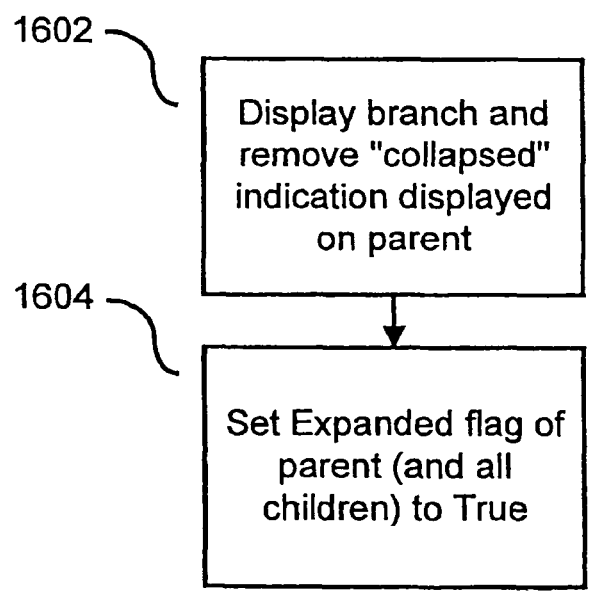
FIG. 16 is a flow chart showing steps performed by the structure editor software when the user expands a branch on the display.
Figure 15B:
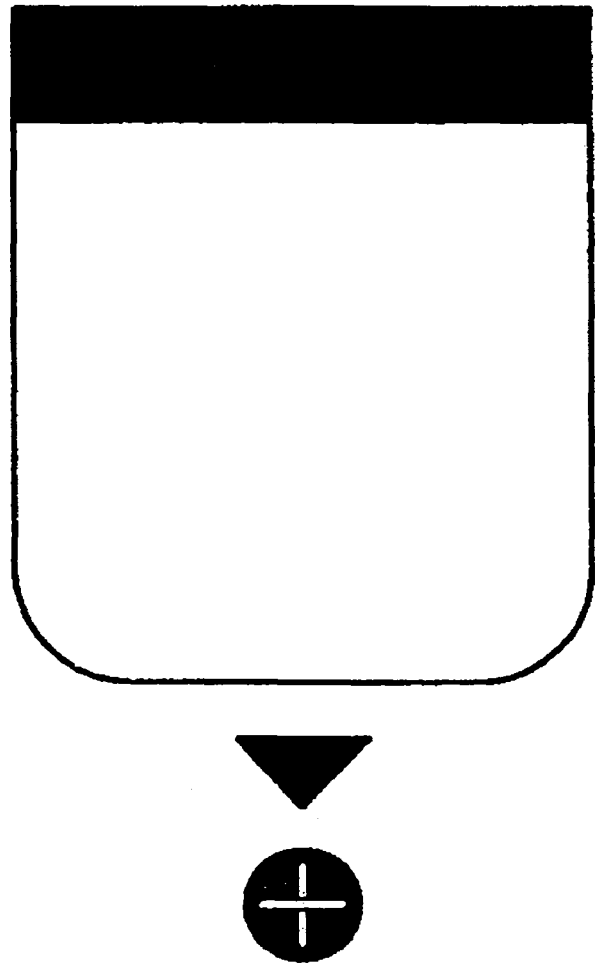
FIG. 15(b) shows a collapsed node.
Figure 19:
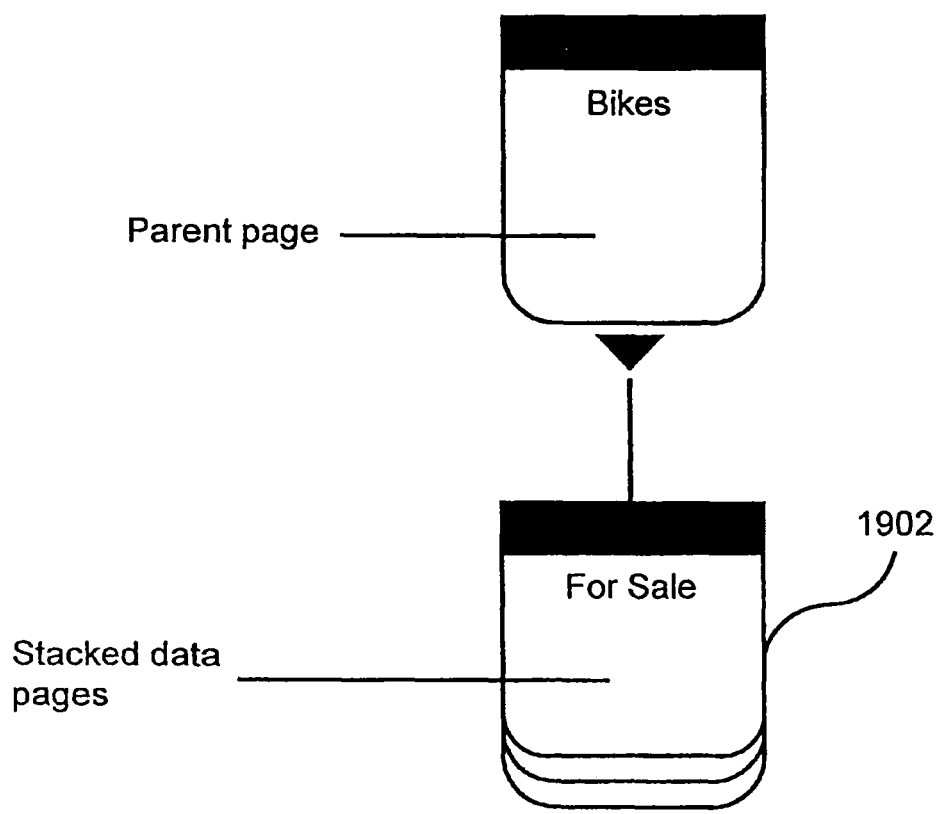
FIG. 19 shows an example of a stacked data page in the site view.

FIG. 15(*a*) is a flow chart showing steps performed by structure editor software 120 when the user collapses a branch on the display. The user collapses a branch by selecting a page icon and selecting "Collapse" from the pull-down view menu. All nodes below the selected node are removed from the display and the selected node is displayed in a predetermined format indicating a collapsed branch. FIG. 15(*b*) shows an example of a collapsed node. When a node is collapsed, its collapsed flag is set to "true." FIG. 16 is a flow chart showing steps performed by structure editor software 120 when the user expands a branch on the display. The user expands a branch by selecting a page icon and selecting "Expand" from the pull-down view menu. The nodes below the selected node in the site hierarchy are displayed and the Collapsed indicator is removed from the selected node. When a node is expanded, its expanded flag is set to "true." FIG. 19 shows an example of adding stacked data pages to the site hierarchy. When a page is a stacked page, it is displayed as overlapping pages 1902. The creation and management of pages is discussed in related U.S. application Ser. No. 08/687,974 of Samir Arora et al., filed concurrently herewith, and entitled "Draw-Based Editor for Web Pages." Generation of HTML for stacked pages are also discussed in the co-pending application. Stacked pages are moved at the site level of FIGS. 3 and 4 in substantially the same manner as normal pages, with the exception that a stacked page causes multiple HTML pages to be generated.

III. Page Creation and Manipulation for the Site

Figure 22:
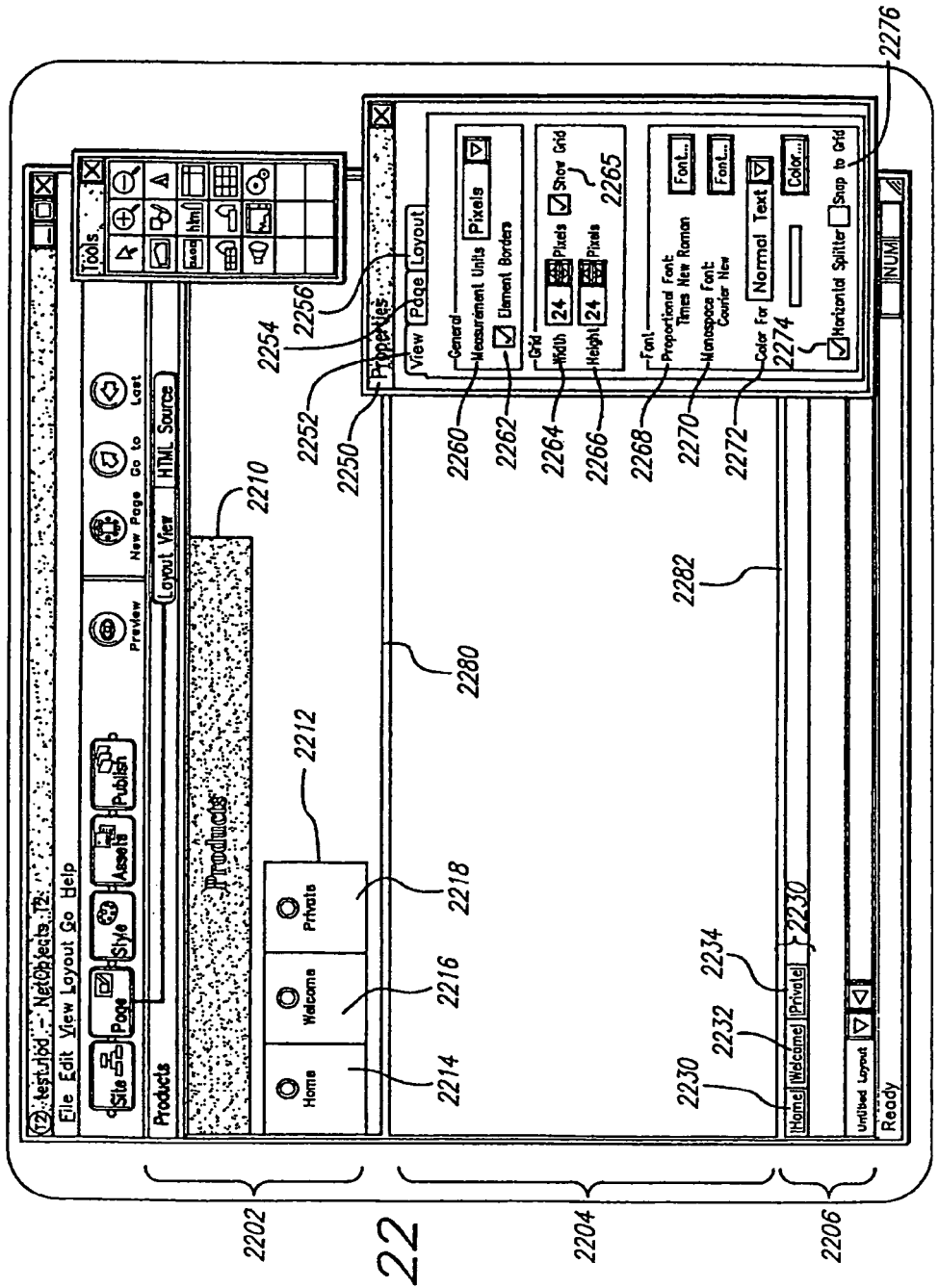
FIG. 22 shows an example of an initial page layout before the user has edited it.

FIG. 22 shows an example of an initial page layout before the user has edited it. FIG. 22 is displayed after the user indicates that he wants to edit a page by preferably: 1) double clicking on a page icon or 2) selecting a page icon and selecting "Page" button 304 of FIG. 3. The display of FIG. 22 is generated by a "page editor" which is described in more detail in related U.S. application Ser. No. 08/687,974 of Samir Arora et al, filed concurrently herewith, and entitled "Draw-Based Editor for Web Pages." The described embodiment of the present invention automatically creates draw objects in memory for each page of the site. The automatically created draw objects reflect links between pages of the site, as described below.

The display of FIG. 22 creates a page having three parts: a header 2202, a body 2204, and a footer 2206. The page editor allows individual scrolling in each of these parts. The described embodiment of the present invention automatically creates display elements of header 2202 and footer 2206. Header 2202 automatically contains a banner 2210 and a plurality of navigator buttons 2212. In the example, the banner contains the name of the selected page icon 456 ("Products") of FIG. 4. Navigator buttons 2212 include buttons for home page 250 ("Home button 2214), the Welcome page 252 ("Welcome" button 2216), and the "Private" page ("Private" button 2216). Navigator buttons 2212 preferably include an image, such as the 3D button image shown in FIG. 22. This image may be predefined or defined by the user through use of a pop-up window.

Thus, in FIG. 22, the navigator buttons 2212 automatically include buttons corresponding to the home page, to the first hierarchical level below the homepage, and to the parent page. Alternate implementations of the present invention automatically display navigator buttons for one or more of the home page, the parent page, sibling pages, the first level, children pages, and any other appropriate pages. In some embodiments, the user chooses which navigator buttons are generated automatically by way of a pop-up site window.

Footer 2206 automatically contains a plurality of text buttons 2230. These text buttons preferably correspond to the navigator buttons 2212. Thus, text buttons 2230 include buttons for home page 250 ("Home text button 2230), the Welcome page 452 ("Welcome" text button 2232), and the "Private" page 454 ("Private" text button 2234). The internal memory representation of banner 2210 and of buttons 2212 and 2230 are discussed in detail below.

FIG. 22 also shows a "Properties" window 2250 in which a "View" tab is selected. Properties window 2250 includes three tabs: a "View" tab 2252, a "Page" tab 2254, and a "Layout" tab 2256. Properties window 2250 currently shows view properties because View tab 2252 is selected. Properties window 32250 includes a "Measurement Unit" area 2260, a "Element border" area 2262, "Grid Width" and "Grid Height" areas" 2264, 2266, a "Show Grid" flag 2265, font size areas 2268, 2272, a "Color" area 2272, a "Horizontal Splitter" flag area 2274, and a "Snap to Grid" flag area 2276.

When the page editor is started, the values of Properties window 326 are properties for the displayed page. Thus, in the example, the grid is measured in unit of pixels. Element borders around each display element are displayed. A grid of 24×24 pixels is displayed. The specified fonts are used. The page uses the colors described in the colors area 2272. Horizontal splitters 2280, 2282 are displayed. The "Snap to Grid" property is turned off. It will be understood by persons of ordinary skill in the art that structure editor software 120 stores values corresponding to this Property window and each Property window discussed herein in memory 104.

Figure 24:
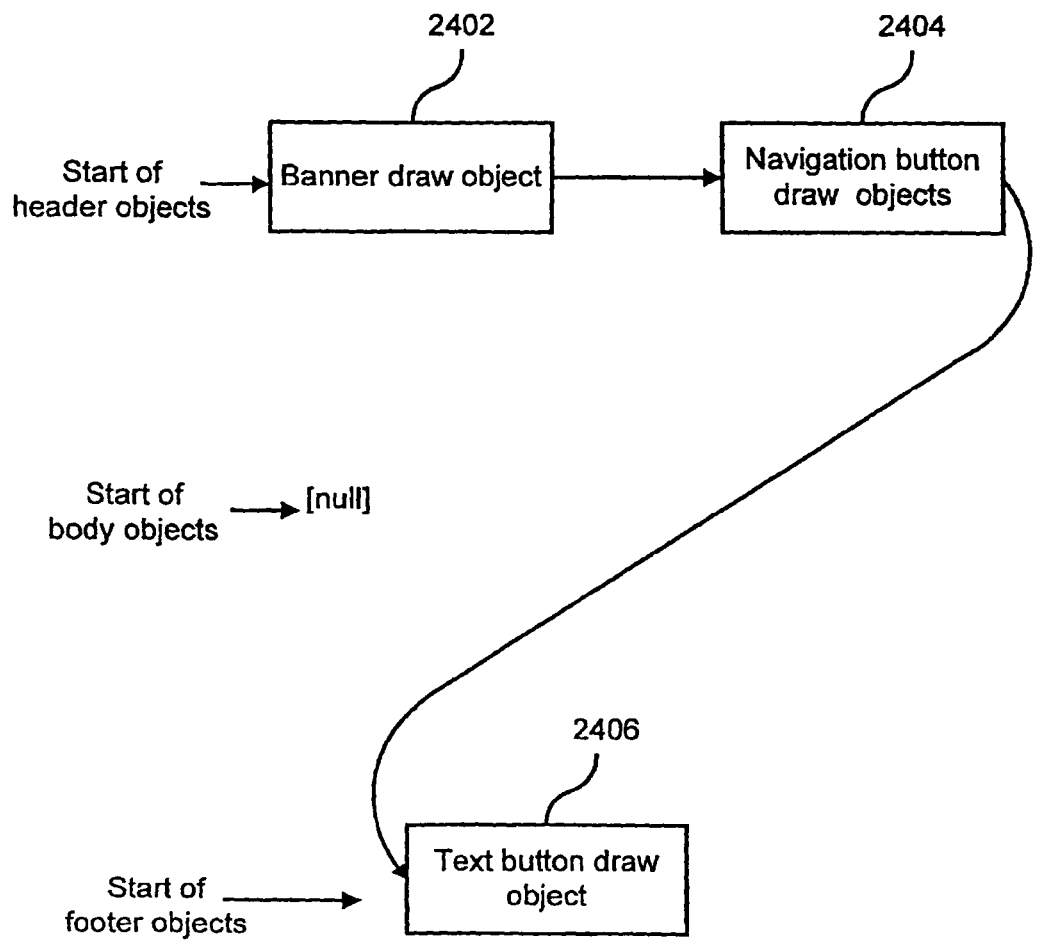
FIG. 24 is an example showing an internal representation stored in a memory of objects automatically generated on the page by the structure editor.

FIG. 24 is an example showing an internal memory representation of draw objects automatically generated by structure editor software 120. The draw objects are generated when a page layout is modified. The internal representation includes a list of objects (a layout object), representing the header, body, and footer of the page of FIG. 22. Thus, the list of draw objects includes a banner draw object 2402 (corresponding to banner 2210), a navigator buttons draw object 2404 (corresponding to navigator buttons 2212), and text buttons draw object 2406 (corresponding to text buttons 2214). In the described embodiment, all draw objects of the header 2202 are stored together in a layout object and a pointer points to the beginning of this list. Similarly, all objects of the footer 2206 are stored together in a layout object and a pointer points to the beginning of this list. In the described embodiment, the user has not entered any elements into the body 2204 and a pointer to body elements points to a null list.

FIG. 25 is an example of a draw object for a page banner. It includes a bitmap of the banner and the name of the page (e.g., "Products"). FIG. 26(*a*) is an example of a draw object for a navigator button. FIG. 26(*a*) includes a node number to which it will link when displayed by a browser, a name of the linked to page, and an image of the navigator button (e.g., a GIF image). FIG. 26(*a*) includes a smart link to another node, which is specified by relationship, and an image. The identity of the link is determined when the page is displayed, previewed, or published. FIG. 27 is an example of a draw object for a text object. It includes a node number to which it will link when displayed by a browser, a name of the linked to page, and a string displayed in the text button. In the described embodiment, each draw object contains its type, its X position, Y position, width, and height. Appendix A shows an example of a draw object of text and a draw image for an image. It will be understood that each type of display element in a page (e.g., text, image, button, etc.) has a corresponding type of draw object.

Figure 23:
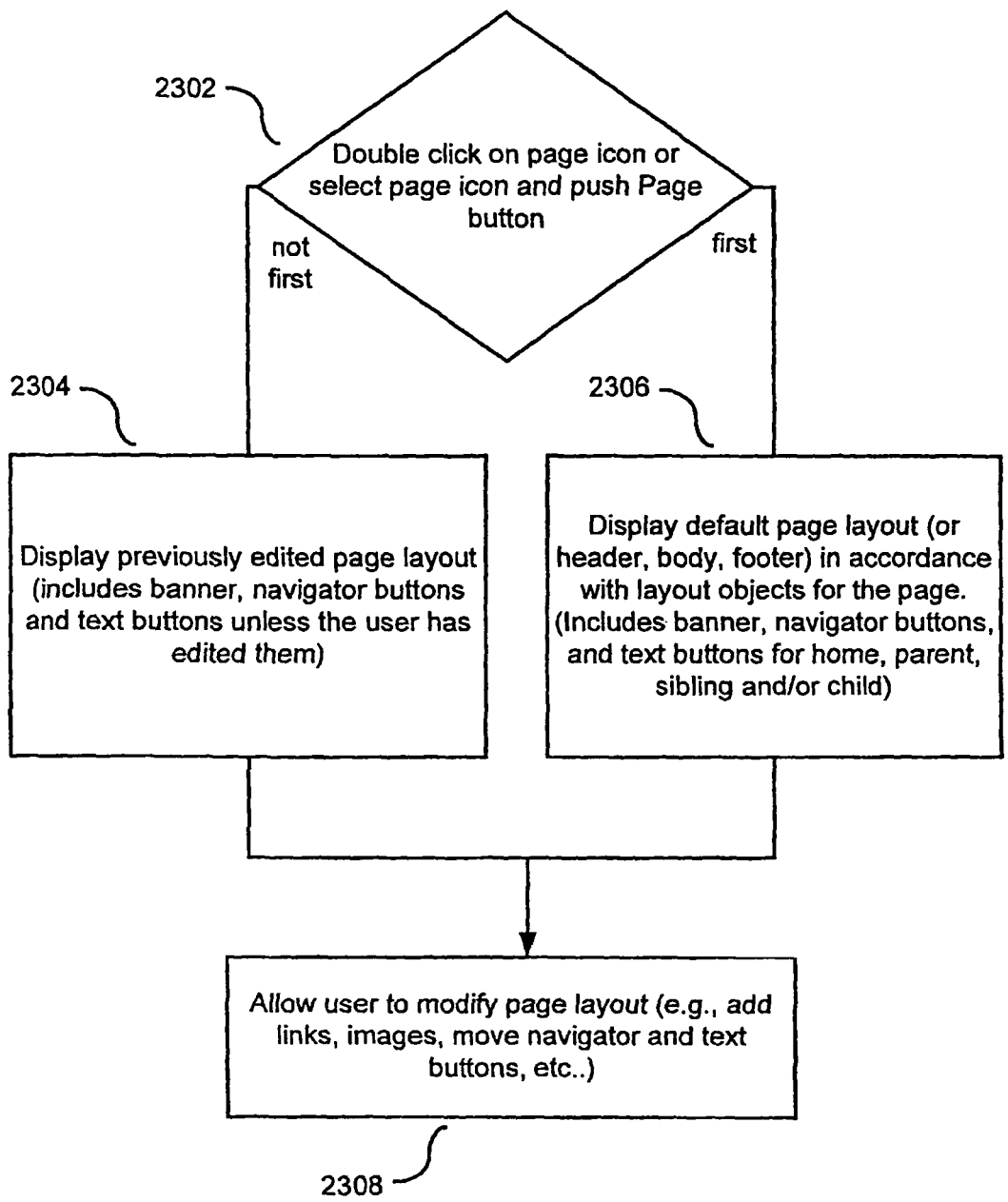
FIG. 23 is a flow chart showing steps performed by the structure editor software to display the page layout of FIG. 22.

FIG. 23 is a flow chart showing steps performed by structure editor software 120 to display the page layout of FIG. 22 during execution of the page editor. In step 2302, the page editor determines whether this is the first time that the page has been edited. If it is not the first time, in step 2304, the current page layout is displayed in accordance with the draw objects for the page. The page layout will include the automatically generated banner, navigator buttons, and text buttons, unless the user has previously deleted them.

If it is the first time, in step 2306, the editor displays the default page layout in accordance with the draw objects for the page. The page layout will include the automatically generated banner, navigator buttons, and text buttons. Step 2308 allow the user to modify the page layout using drag and drop methods as described in U.S. application Ser. No. 08/687,974 of Samir Arora et al, filed concurrently herewith, and entitled "Draw-Based Editor for Web Pages." It will be understood that the user does not have to modify the page at all if he doesn't want to. The automatically generated page elements will still be a part of the page. The user exits the page editor by, e.g., clicking on Site button 302, Style button 206, Assets button 308, or publish button 310. After the user has edited a page, he can still move the page around in the site hierarchy by using the structure editor.

IV. HTML Generation for the Site

Figure 28:
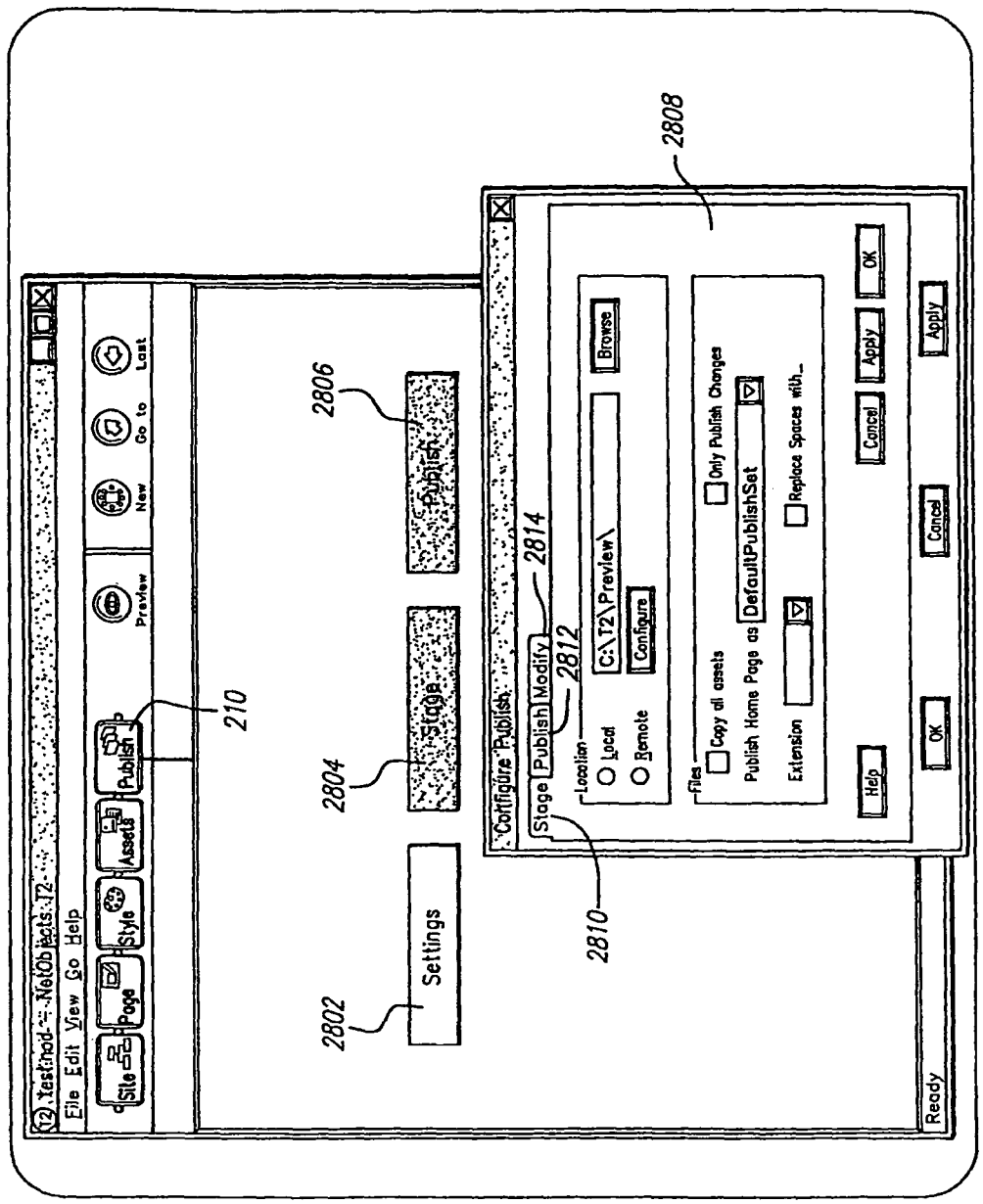
FIG. 28 shows an example of a display used to allow the user to publish the pages of a site.

Once the user has created a hierarchy of pages for the site as described above, the user needs to be able to generate HTML for all pages of the site. FIG. 28 shows an example of a display used to allow the user to publish the pages of a site. FIG. 28 shows a screen displayed when the user clicks on "Publish" button 310 of FIG. 3. The screen includes three buttons "Settings" 2802, "Stage" 2804, and "Publish" 2806. Once the display of FIG. 28 is displayed, the user can either "stage" or "publish" his site. Generally, staging is performed first and publishing is performed once the site is debugged. Staging and publishing are substantially the same, differing in when they are performed during the site development process. The user can also set configuration parameters to control the publishing or staging process. Clicking on either "publish" button 2802 or "Stage" button 2804 causes the described embodiment to generate HTML code for each page in the site (or only for pages indicated by the publish flag or by the user). This process is described below.

Figure 29:
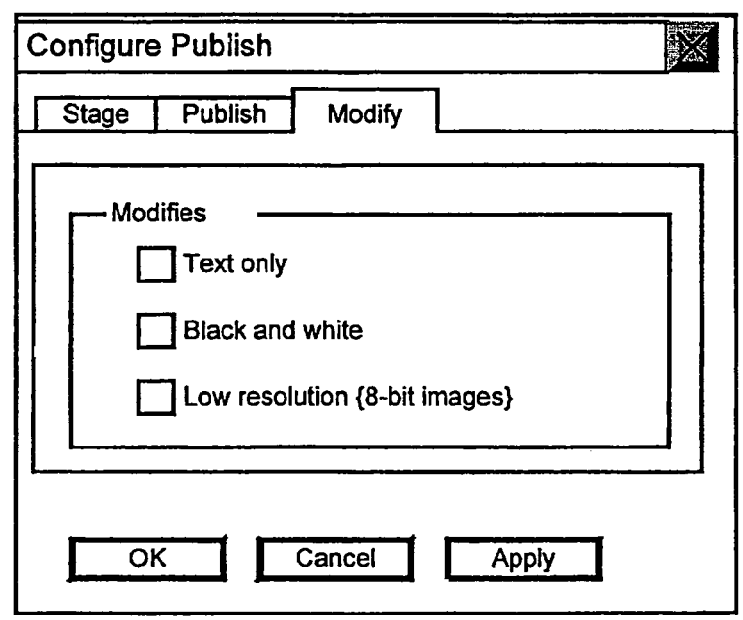
FIG. 29 shows an example of a display used to allow the user to specify details of how to publish a site.

Clicking on "Settings" button 2802 causes a pop-up window 2808 to be displayed. Clicking on "Stage" tab 2810 or "Publish" tab 2812 will display a window, which allows the user to specify a storage location for the staged or published site. Clicking on a "Modify" tab 2814 causes the pop-up window 2902 of FIG. 29 to be displayed. Window 2902 allows the user to indicate certain attributes of the HTML to be generated for the site (e.g., text only, black and white (grayscale), or low-resolution).

Figure 30:
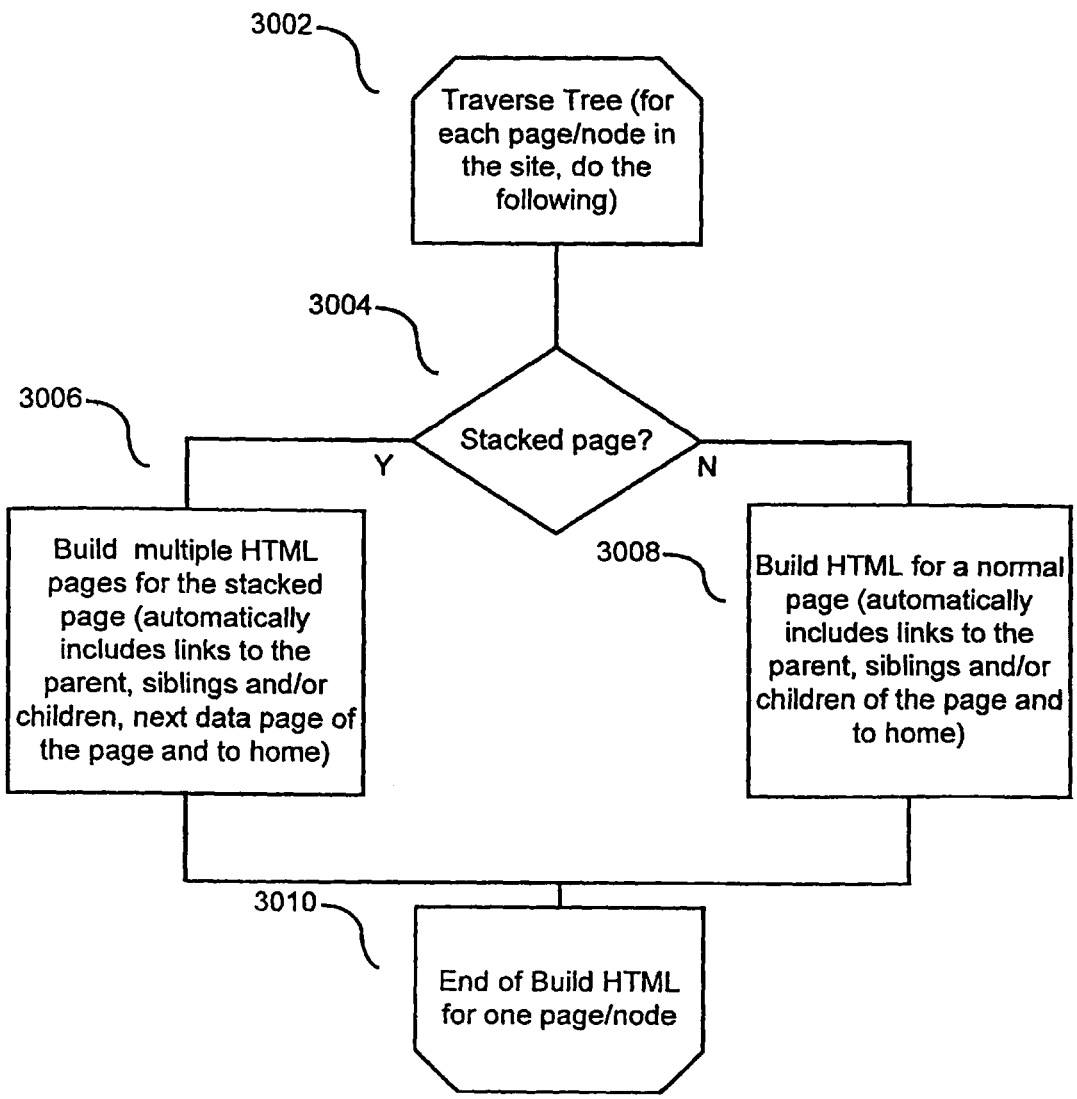
FIG. 30 is a flow chart showing steps performed by the structure editor software to publish all the pages of a site.

FIG. 30 is a flow chart showing steps performed by structure editor software 120 to publish all the pages of a site. It will be understood that the steps of FIG. 30 are performed by processor 102 executing instructions in structure editor software 120. In FIG. 30, steps 3002 through 3010 form a loop repeated for each page in the site, i.e., for each page object stored in the memory. In the described embodiment, the tree of page objects is traversed in a recursive, depth first manner in a manner known to persons of ordinary skill in the art. For each page object, in step 3004, if the stacked flag of the current page object indicates that the current page is a stacked page, then processor 102 creates HTML for a plurality of pages. If the current page object is not a stacked page then, in step 3008, processor 102 builds HTML for a "normal" page. In either case, the HTML for the page is then written to a storage medium of the system.

It will be understood that, generally, each page object has a corresponding list of draw objects describing the elements of the page for the header, body and footer of the page, and that processor 102 generates HTML in accordance with the draw objects. As described above, each list of draw objects automatically includes draw objects representing automatically generated banners and links (e.g., to the home, first level, parent, sibling, and/or children pages of that page). The draw objects of a page may also represent other, additional links added by the user that are not a part of the site hierarchy. Moreover, the user can use the page editor to remove some of the automatically generated draw objects links if he so desires. Unless the user explicitly removes them, however, these automatically generated links are present in each page layout. Thus, the generated HTML for each page will contain links to the home, parents, siblings, and/or children pages for each page of the site view.

V. HTML Generation for a Page

Figure 31:
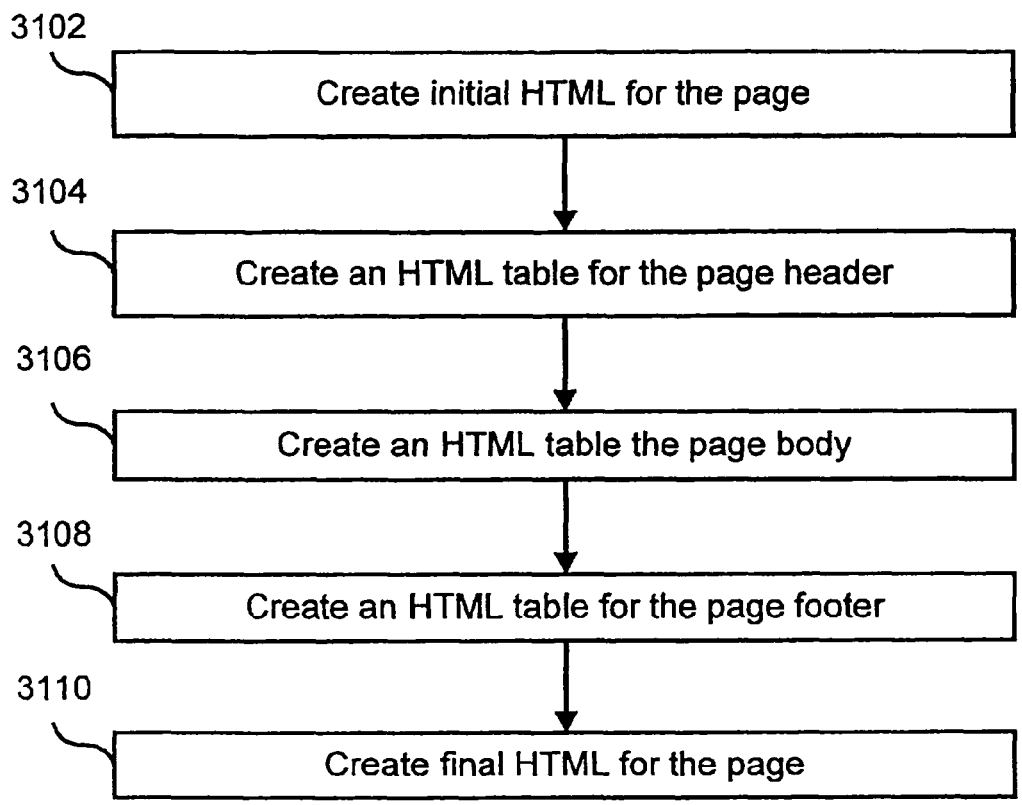
FIG. 31 is a flow chart showing steps performed by the structure editor software to publish a single page.
Figure 32:
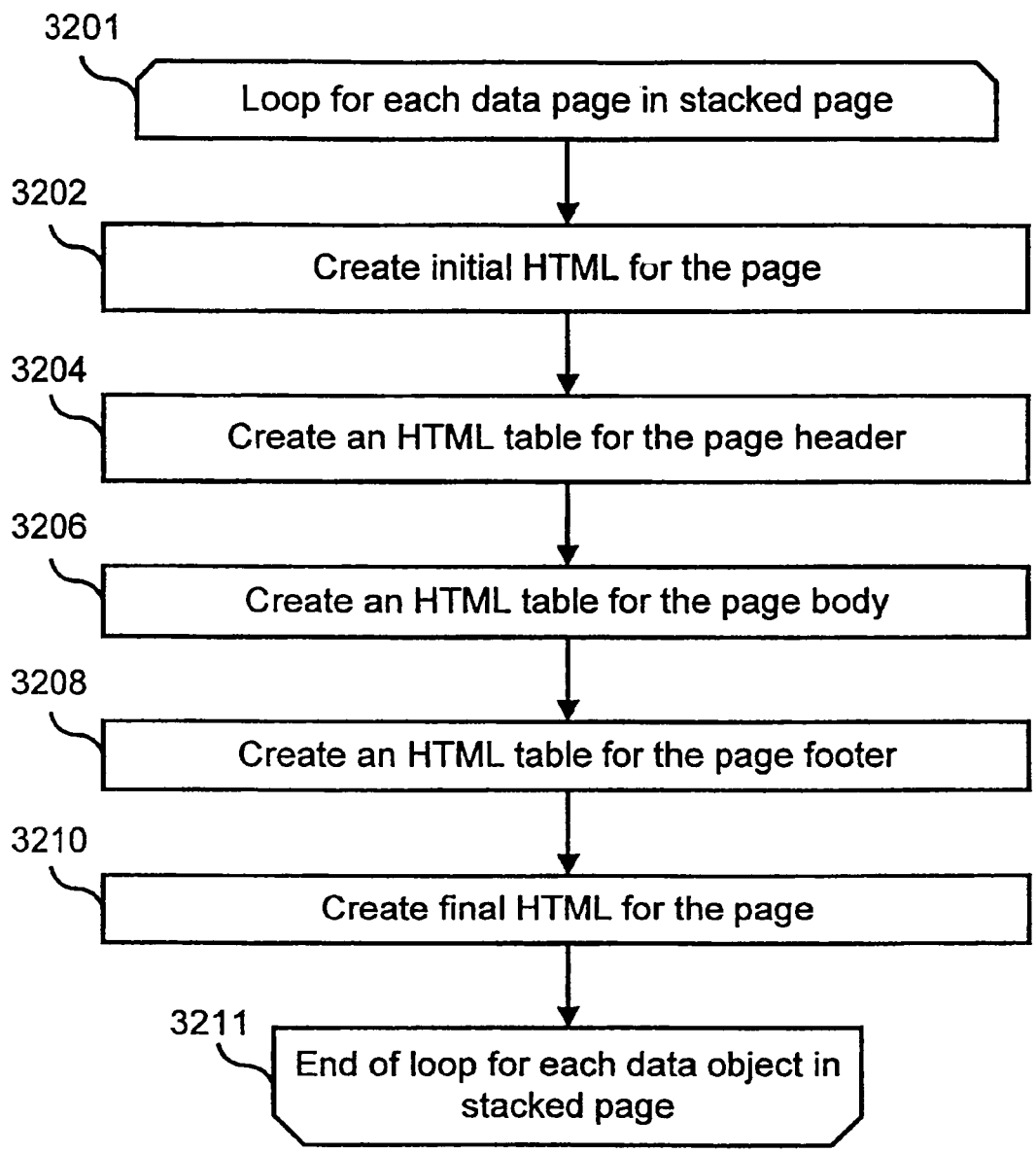
FIG. 32 is a flow chart showing steps performed by the structure editor software to publish a stacked page.
Figure 33:
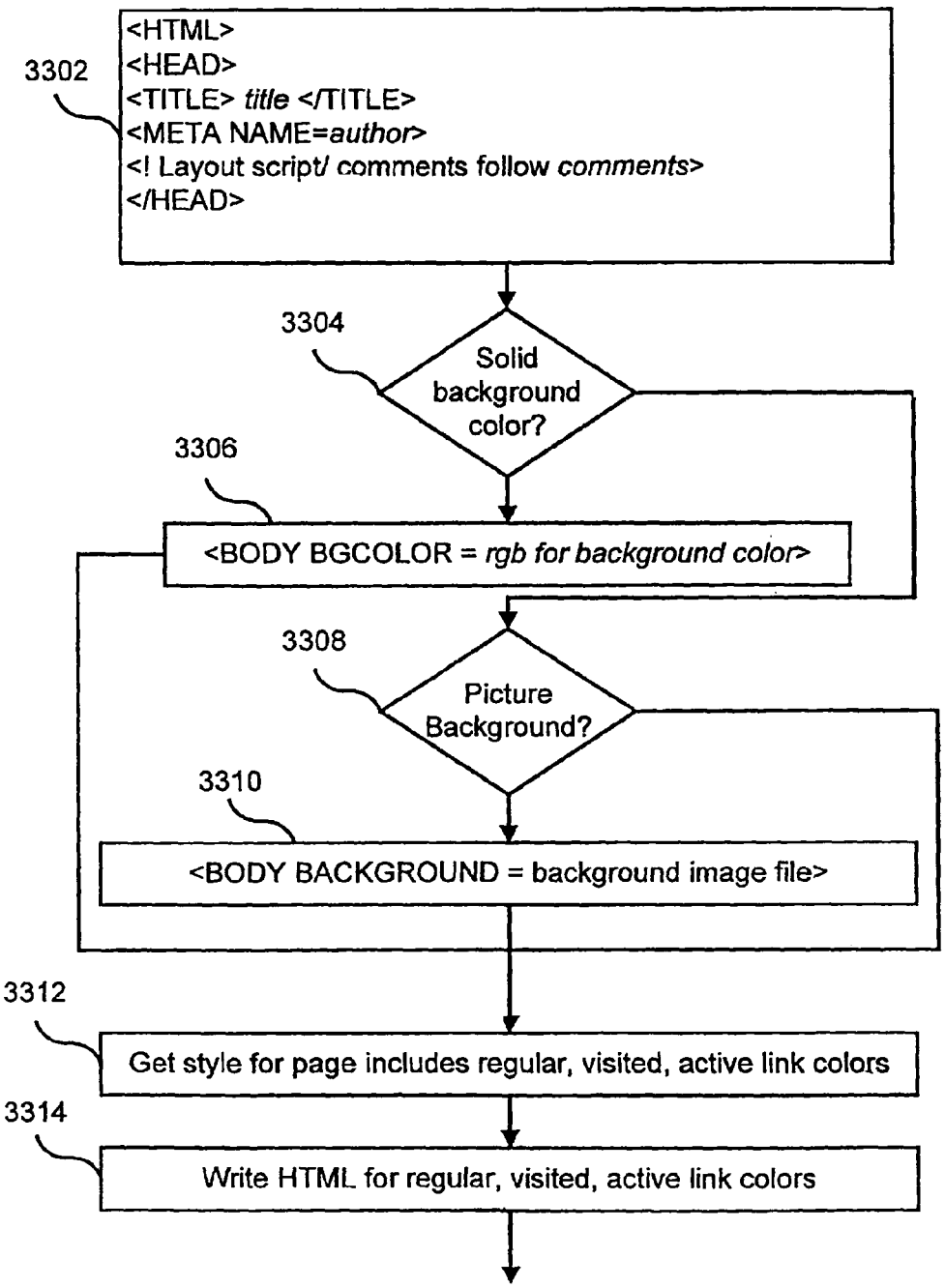
FIG. 33 is a flow chart showing steps performed by the structure editor software to generate initial HTML for a page.
Figure 34:
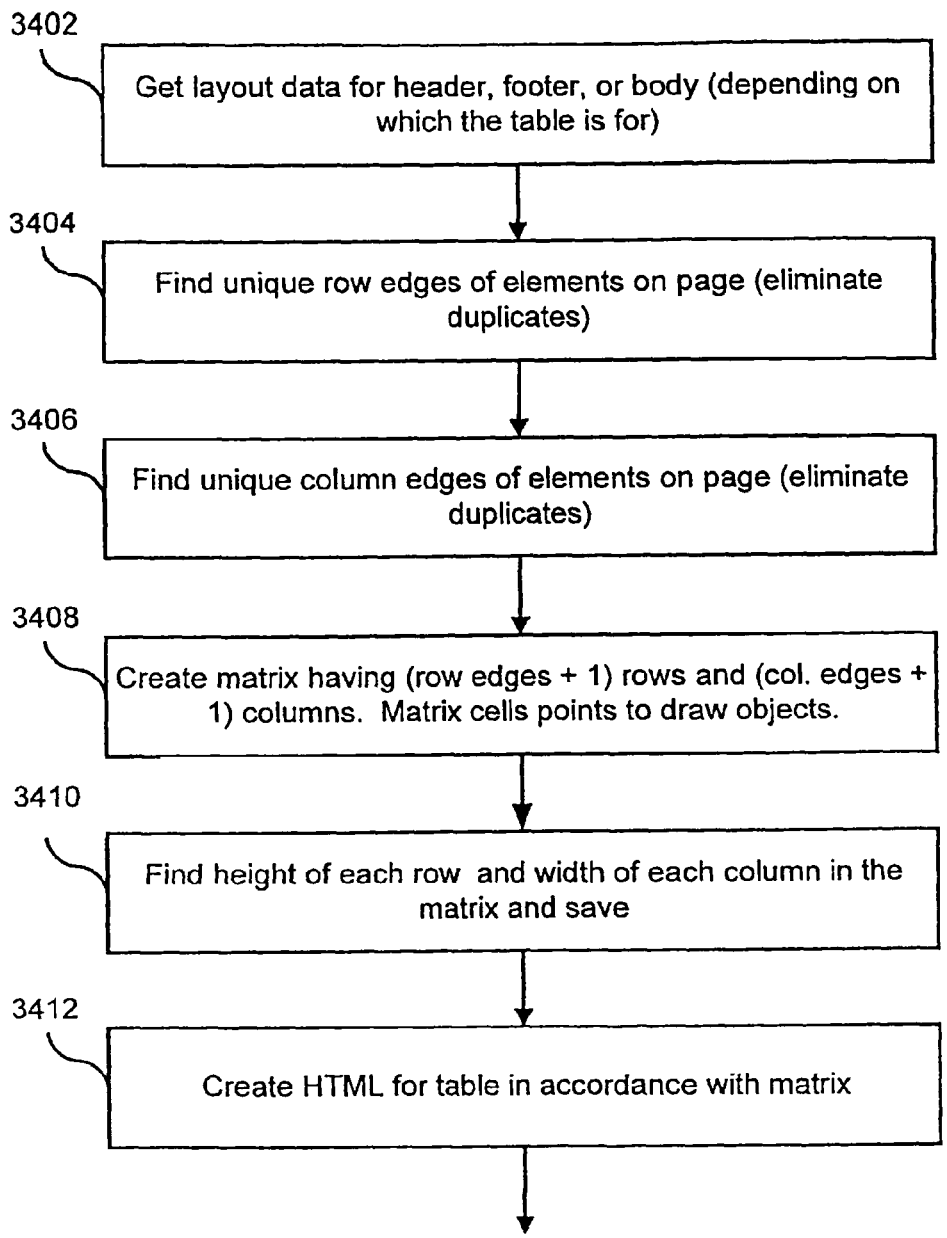
FIG. 34 is a flow chart showing further steps performed by the structure editor software to generate an HTML table for layout elements of a page, such as a header, body, and footer.
Figure 35:
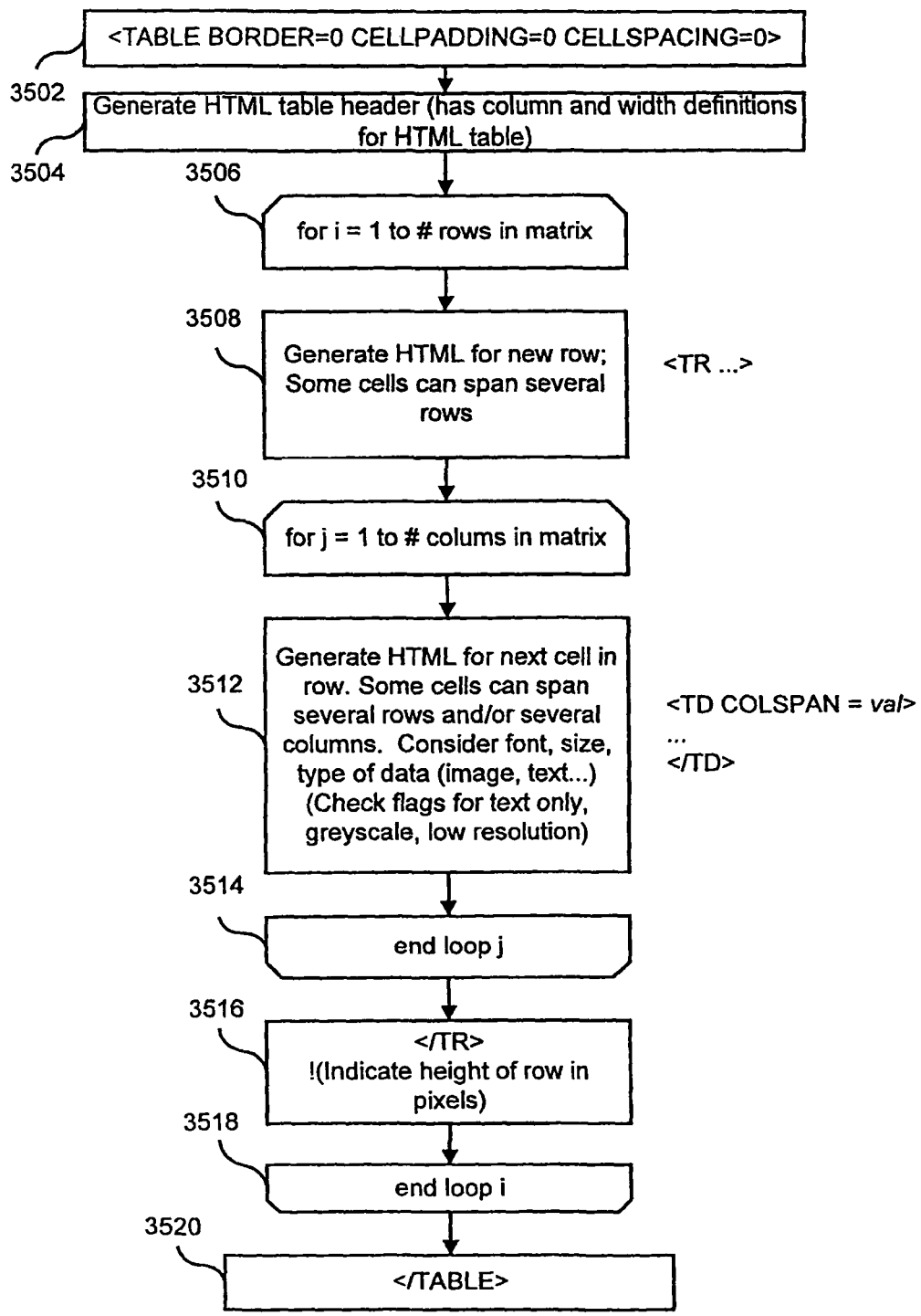
FIG. 35 is a flow chart showing steps performed by the structure editor software to generate an HTML table.

FIG. 31 is a flow chart showing steps performed by the structure editor software to publish a normal page. FIG. 32 is a flow chart showing steps performed by the structure editor software to publish a stacked page. The steps of FIGS. 31 and 32 are similar, except that the steps of FIG. 32 generates multiple HTML pages for the stacked page. Step 3110 creates initial HTML for the page as shown in FIG. 33. This step creates the beginning of an HTML page. Steps 3104-3108 create HTML tables for each of the header, body, and footer as shown in FIGS. 34 and 35. Step 3110 creates final HTML for the end of the page as shown in FIG. 36. The preferred embodiment generates Netscape HTML versions 3.X.

FIG. 32 shows the creation of a plurality of HTML pages for a stacked page. Each HTML contains, for example, data for one record of a database associated with the stacked page. Each of the plurality of HTML pages has a common format including the same fields of the database and the same layout of the fields. Each page of the plurality of pages has the same format, but different data.

Step 3314 of FIG. 33 shows that the HTML for a page includes a tag specifying the colors that a browser will use to display regular, visited, and active links. Other embodiments specify other HTML tags that specify other attributes common to the page.

FIG. 34 is a flow chart showing steps to build an HTML table. In the described embodiment, an HTML table is generated for the header, body, and footer of each page. Steps 3402-3408 generate a matrix in memory 104 as discussed below in connection with FIGS. 37-40. Step 3410 create the HTML table in accordance with the matrix as shown in FIG. 35.

FIG. 35 shows steps that create an HTML table. Step 3502 writes a table tag including a border of zero width and cell padding and cell spacing of zero. Step 3504 generates a table header including column and width definitions for the HTML table. Steps 3506-3518 go through each row and column of the matrix to generate a plurality of cells in the HTML table. Some of the cells in the HTML table can be several columns wide and/or several rows high. Step 3520 generates an end of table tag.

Figure 37:
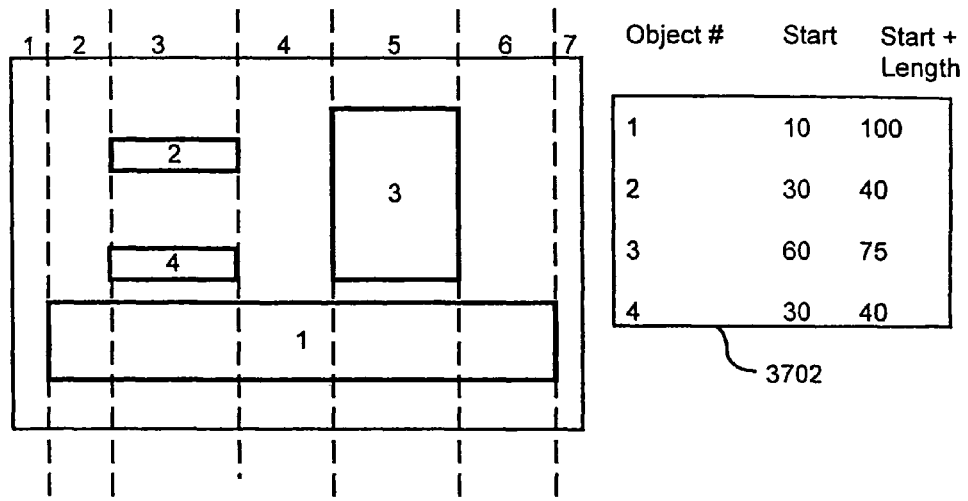
FIG. 37 is an example of first steps involved in determining an HTML table size.
Figure 37:
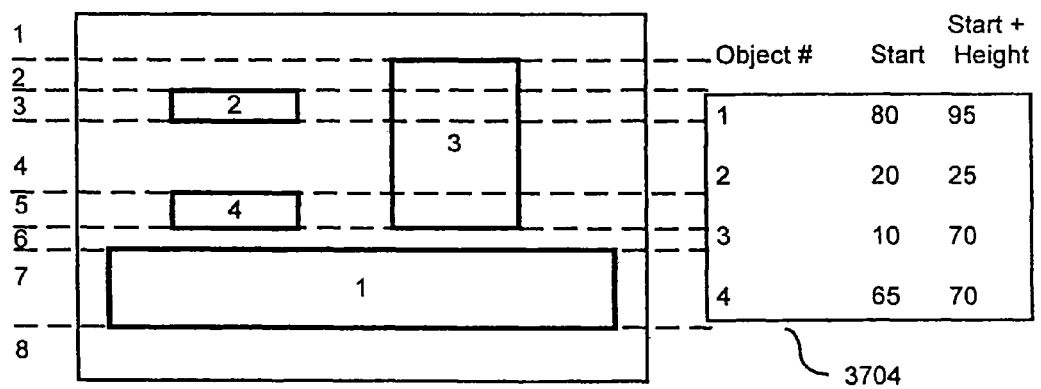
Figure 38:
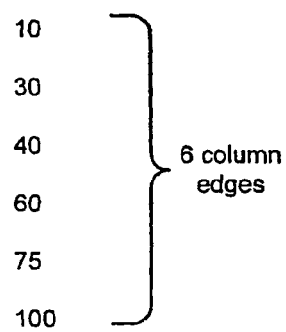
FIG. 38 is an example of second steps involved in determining an HTML table size.
Figure 38:
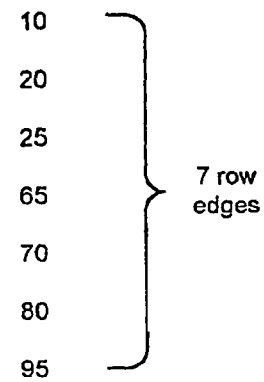
Figure 38:
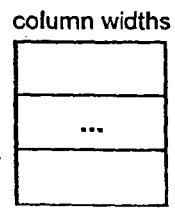
Figure 38:
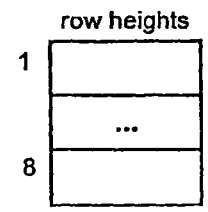

FIG. 37 is an example of first steps involved in determining an HTML table size for a layout element of a header, body, or footer. In the example, the layout element has four display elements. Each display element corresponds to one draw object of the page. As discussed above, each draw object has an X position (a start row) and a length. Each draw object also has a Y position (a start column) and a height. For each object, a first column edge is the X start position and a second column edge it the X start position plus the length. In addition, for each object, a first row edge is the Y start position and a second row edge is the Y start position plus the height. Processor 102 finds the row edges and columns edges for a current page, yielding data 3702 and 3704.

FIG. 37 is an example of second steps involved in determining an HTML table size for a layout element. Once the column and row edges of the draw objects are determined, the edges are sorted, duplicate edges are removed from the sorted list, yielding unique row edges and unique column edges (steps 3404 and 3406 of FIG. 34). The unique rows edges and column edges are then counted. In the example, the objects have six column edges and seven row edges. Once the unique row edges and column edges are determined, the column widths and row heights for each column and row are determined.

Figure 39:
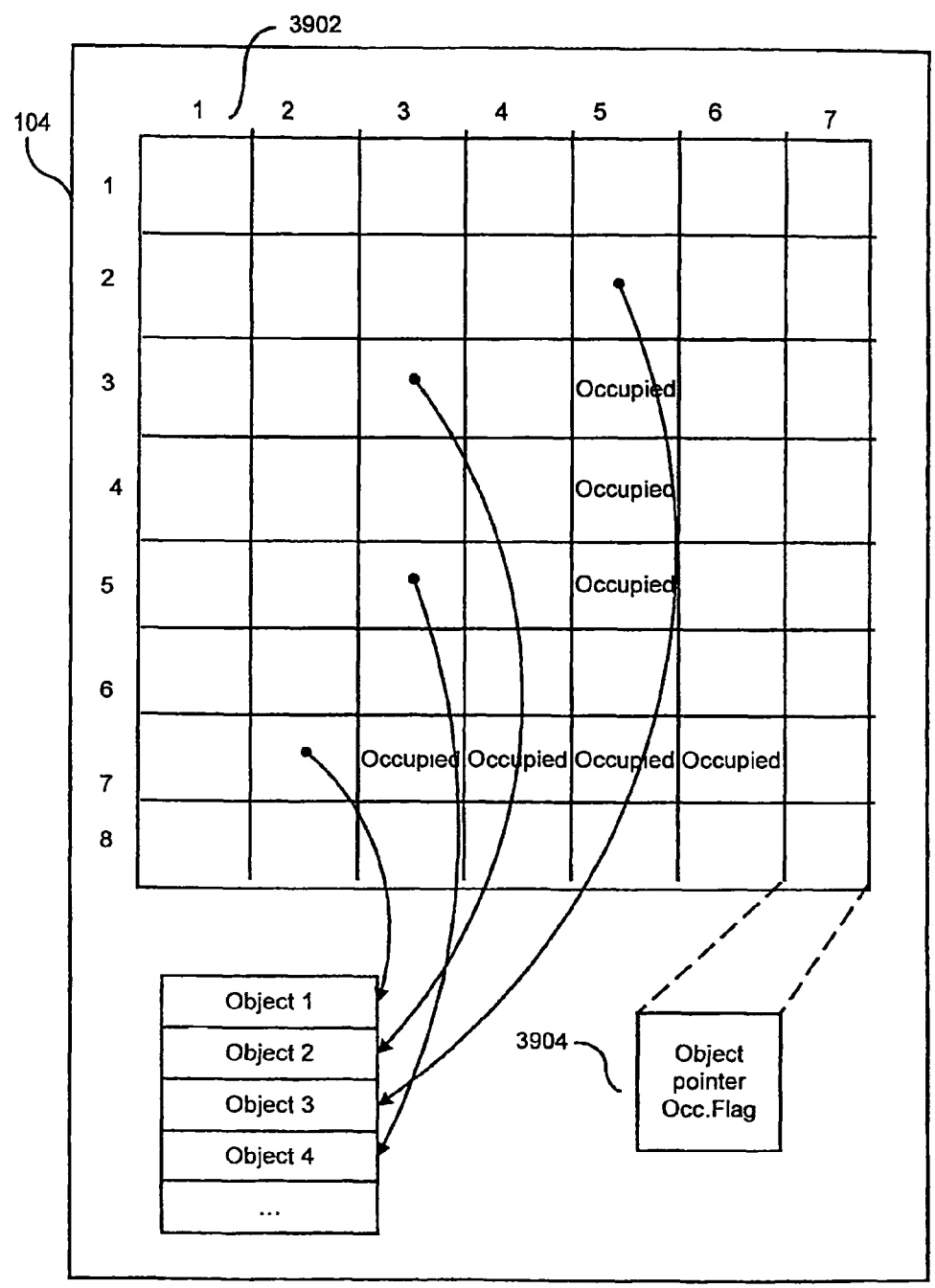
FIG. 39 is an example of a matrix generated by the steps of FIGS. 37 and 38.

FIG. 39 is an example of a matrix 3802 generated in accordance with the edges and draw objects. Matrix 3902 has a number of rows equal to the number of row edges plus one. The matrix has a number of columns equal to the number of column edges plus one. Thus, in the example, the matrix has seven columns and eight rows. Each element 3904 of the matrix has a pointer field and an occupied flag. The element of row 7, column 2 of the matrix points to object number 1 and is marked as occupied. The next four elements in row 2 are also marked as occupied. The element of row 3, column 3 points to object number 2 and is marked as occupied. The element of row 2, column 5 points to object number 3 and is marked as occupied. The next four elements in column 5 are also marked as occupied. The element of row 5, column 3 points to object number 4 and is marked as occupied.

Figure 40:
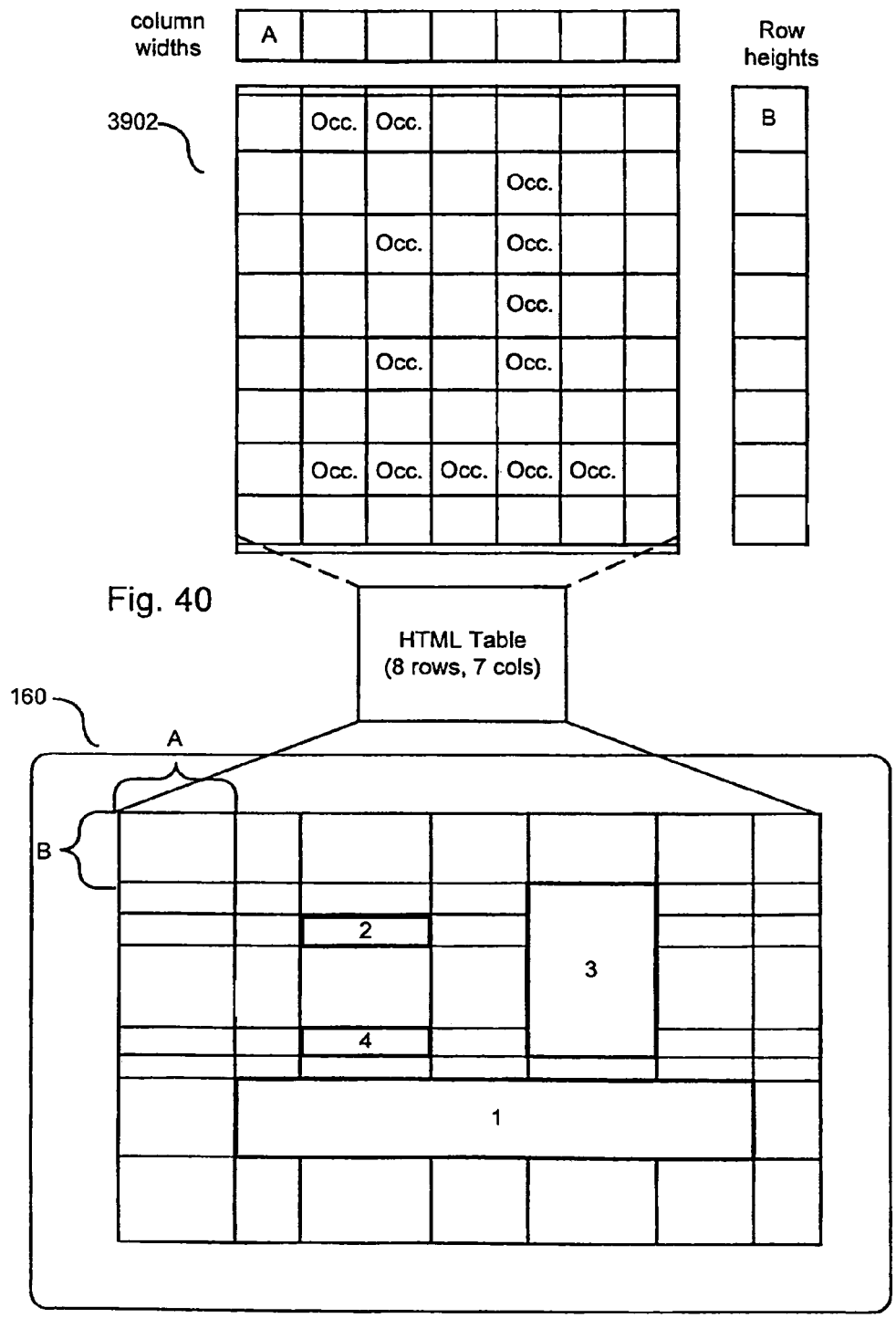
FIG. 40 is a block diagram of how the matrix of FIG. 39 is used to generate an HTML table, which a browser uses to display a portion of a page.

FIG. 40 is a block diagram of how the matrix 3902 is used to generate an HTML table. The HTML table is used by a browser to display a portion of a page on display device 160 (such as a header, body, or a footer. (an alternate embodiment of the present invention creates a single table for each page of the site). Each element of the matrix is used to generate a cell in an HTML table (although some cells occupy more than one row or more than one column). For example, the matrix element in row 1, column 1 causes an empty table cell to be generated. Each row in the HTML table has a height in pixels that is equal to the height for that matrix row. Each cell in the HTML table has a width that is equal to the width of the matrix for that column.

As is known to persons of ordinary skill in the art, the cells in the table can be of varying sizes (i.e., can use the HTML tags "ROWSPAN" and COLSPAN"). The matrix element in row 2, column 5 causes generates of a cell that spans four rows (ROWSPAN=4). The matrix element in row 7, column 2 causes generation of a cell that spans five column (COLSPAN=5).

Figure 41:
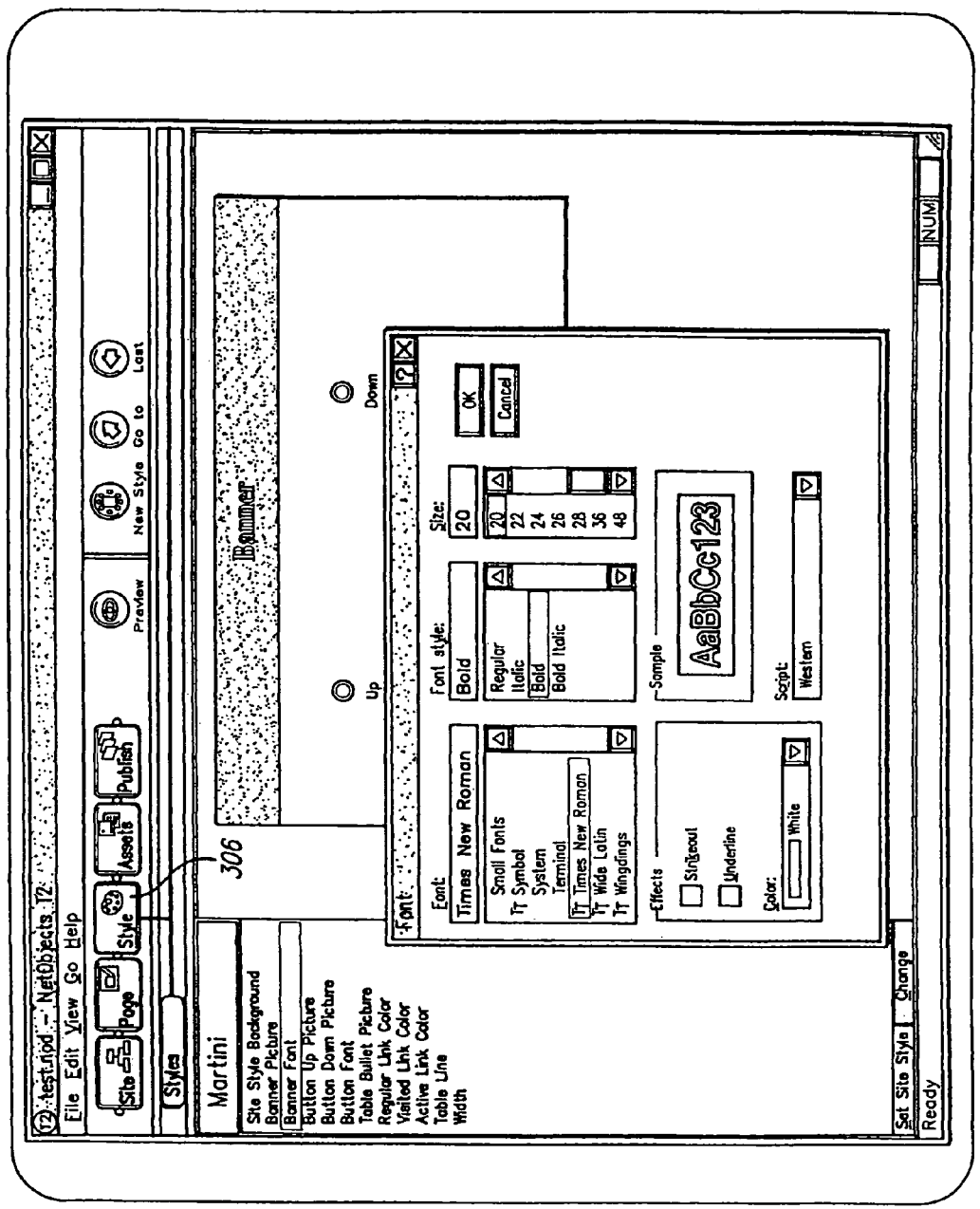
FIG. 41 shows an example of a Style display.

FIG. 41 shows an example of a Style display. The display of FIG. 41 is shown when the user selects Style button 306. The Style button display allows the user to select an overall default appearance of all pages in the site. The user can override the style for a given page by defining a different style for the page (not shown). In the described embodiment, the values shown in FIG. 41 are stored in locations of memory 104. The automatic generation of banners, navigation buttons, and text buttons is performed in accordance with user-specified style values.

Figure 42:
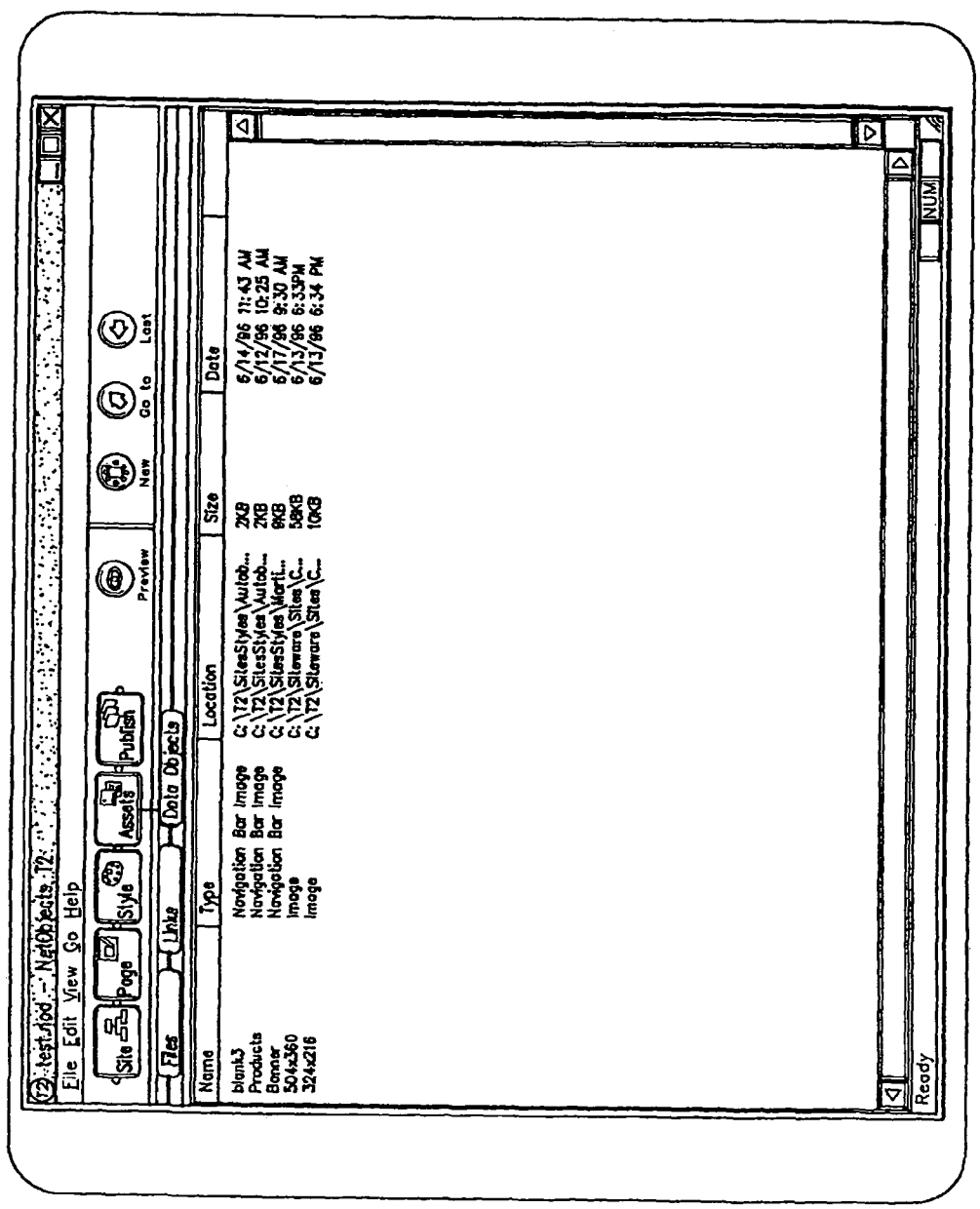
FIG. 42 shows an example of an Assets Display.

FIG. 42 shows an example of an Assets Display. The Assets display shows the files, links, and objects in the data processing system. For example, the assets shown in FIG. 42 are the draw objects for the "Products" page of FIG. 22.

FIG. 43 shows an example of a plurality of link dialog boxes, showing a structural link, an internal link, and an external link.

Figure 44:
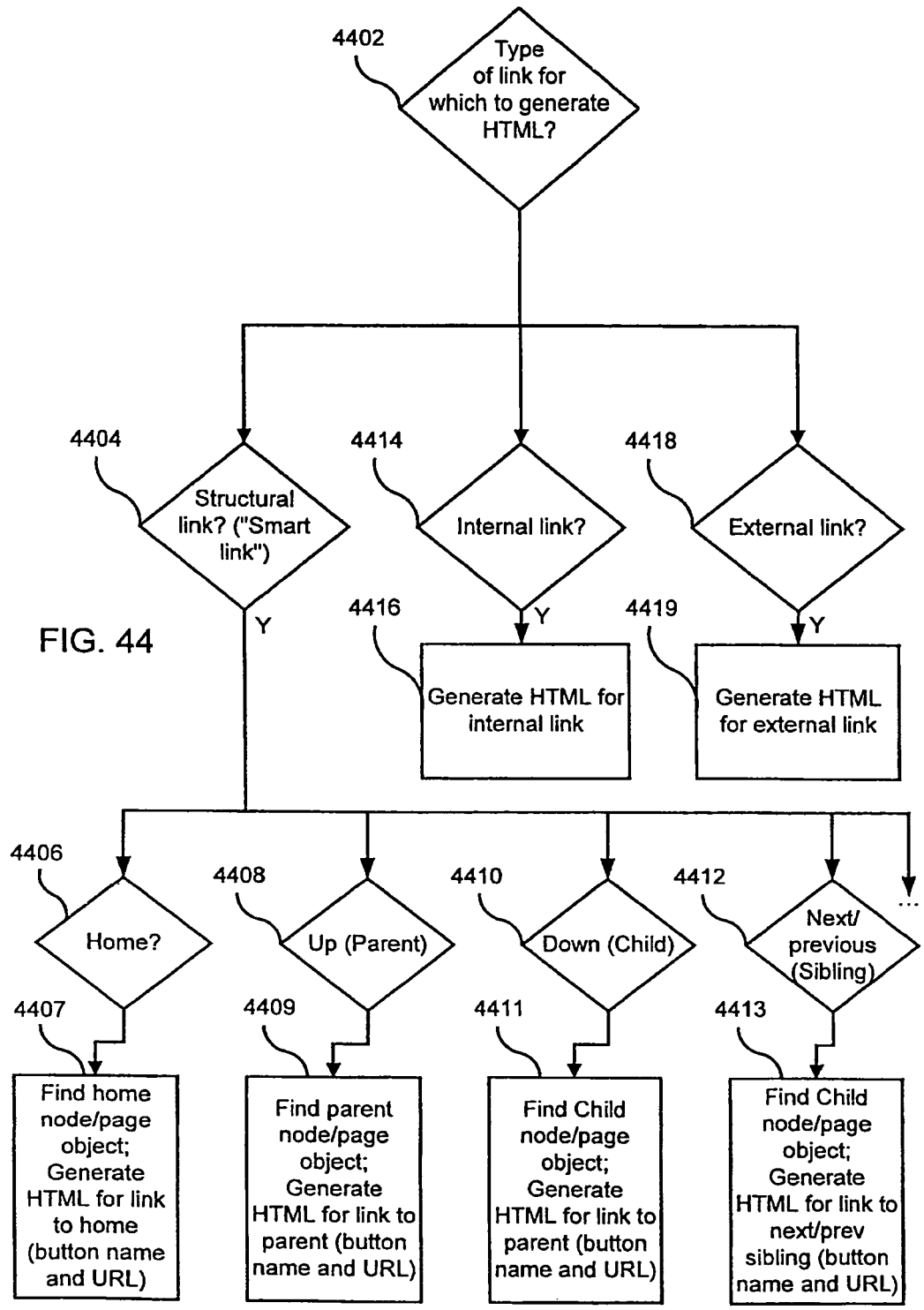
FIG. 44 is a flow chart showing identification of structural links for a page.

FIG. 44 is a flow chart showing identification of structural links for a page. The links preferably are identified when the page is displayed, previewed or published. Internal and external links are "absolute" links. Structural links are identified only as "next sibling link," "next child link", etc. For each link, the node-that-is-linked-to is identified by looking at the page hierarchy specified by the page layout tree. After the node is identified, the processor finds the URL, name, etc of the node and generates the display or HTML for the structural link.

In summary, the described embodiment of the present invention allows a user to define a hierarchy of pages for a Web Site. A structure editor in accordance with the present invention automatically creates page objects for each site that reflects the user-defined site hierarchy. Each page has an associated plurality of draw objects that define the display elements of the page. When the user "publishes" a page, the described embodiment generates HTML code for each page. Thus, even if the user never edits a page, and only creates a site hierarchy, each page will have an automatically created banner and automatically created links to other pages of the site. The links can be structural links (smart links), internal links, or external links. Moreover, the pages of the site conform to a user-specified style.

Other embodiments will be apparent to those skilled in the art from consideration of the specification and practice of the invention disclosed herein. It is intended that the specification. and examples be considered as exemplary only, with a true scope of the invention being indicated by the following claims and equivalents.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method for publishing a hierarchically-defined web site comprising the steps of:
providing, by a processor, a graphical user interface;
receiving input defining a hierarchy of pages of a web site to be published, the hierarchy of pages defined in response to input manipulating icons representing pages of the web site in the graphical user interface;
storing, in memory, a representation of the hierarchy of the web site based on the received input;
identifying, based on the stored representation, a connection between a first page of the web site and a second page of the website;
generating a hypertext mark-up link from the first page to the second page based on the identified connection; and
publishing the website by generating hypertext mark-up for at least the first page, wherein publishing comprises including the generated hypertext mark-up link from the first page to the second page in the generated hypertext mark-up for the first page.

2. The method of claim 1 wherein said generating a hypertext mark-up language link comprises providing a uniform resource locator.

3. The method of claim 1 wherein said generating a hypertext mark-up language link comprises providing hypertext mark-up for generating a button displaying a name of the page to which the link points.

4. The method of claim 1 wherein identifying, based on the stored representation, a connection between a first page of the web site and a second page of the website comprises determining that the first page and second page are sibling pages.

5. The method of claim 1 wherein identifying, based on the stored representation, a connection between a first page of the web site and a second page of the website comprises determining that the first page is a parent page of the second page.

6. A computer program product comprising a computer program, stored on a non-transitory computer readable medium, that causes a computer to perform steps comprising:
providing a graphical user interface;
receiving input defining a hierarchy of pages of a web site to be published, the hierarchy of pages defined in response to input manipulating icons representing pages of the web site in the graphical user interface;
storing, in memory, a representation of the hierarchy of the web site based on the received input;
identifying, based on the stored representation, a connection between a first page of the web site and a second page of the web site;
generating a hypertext mark-up link from the first page to the second page based on the identified connection; and
publishing the website by generating hypertext mark-up for at least of the first page, wherein publishing comprises including the generated hypertext mark-up link from the first page to the second page in the generated hypertext mark-up for the first page.

7. The computer program product of claim 6 wherein generating a hypertext mark-up link comprises providing a uniform resource locator.

8. The computer program product of claim 6 wherein generating a hypertext mark-up link comprises providing hypertext mark-up for generating a button displaying a name of the page to which the link points.

9. The computer program product of claim 6 wherein identifying, based on the stored representation, a connection between a first page of the web site and a second page of the website comprises determining that the first page and second page are sibling pages.

10. The computer program product of claim 6 wherein identifying, based on the stored representation, a connection between a first page of the web site and a second page of the web site comprises determining that the first page is a parent page of the second page.

11. A system comprising:
a processor; and
a memory,
wherein the memory embodies one or more program components that configure the processor to:
generate a graphical user interface;
receive input via the graphical user interface, the input defining a hierarchy of a web site to be published, the hierarchy of pages defined in response to input manipulating icons representing pages of the web site in the graphical user interface;
store, in the memory, a representation of the hierarchy;
identify a connection between a first page of the web site and a second page of the web site based on the representation of the hierarchy;
generate a link from the first page to the second page; and
publish the web site,
wherein publishing the web site comprises:
generating code for use in rendering the first page, the generated code including the generated link from the first page to the second page, and
storing the generated code in a computer-readable medium.

12. The system set forth in claim 11 wherein the connection indicates that the first page is a parent, child, or sibling of the second page.

13. The system set forth in claim 11, wherein publishing the web site comprises generating code for use in rendering the first page and code for use in rendering the second page, the generated code for use in rendering the first page including the link from the first page to the second page and the generated code for use in rendering the second page including a link from the second page to the first page.

14. The system set forth in claim 11, wherein the code for use in rendering the first page comprises hypertext mark-up code and the generated link comprises a uniform resource locator.

* * * * *